United States Patent
Jin et al.

(10) Patent No.: US 9,946,693 B2
(45) Date of Patent: Apr. 17, 2018

(54) DISPLAYING OF WEBPAGE COMMENTS IN AN ORDER ACCORDING TO THE NUMBER OF WEBPAGE COMMENTS

(71) Applicant: Guangzhou Shenma Mobile Information Technology Co., Ltd., Guangzhou (CN)

(72) Inventors: Zhiting Jin, Guangzhou (CN); Qiuhui Li, Guangzhou (CN); Zhiyu Zhang, Guangzhou (CN); Yaoyu He, Guangzhou (CN)

(73) Assignee: Guangzhou Shenma Mobile Information Technology Co., Ltd., Guangzhou (CN)

( * ) Notice: Subject to any disclaimer, the term of this patent is extended or adjusted under 35 U.S.C. 154(b) by 0 days.

(21) Appl. No.: 15/348,539

(22) Filed: Nov. 10, 2016

(65) Prior Publication Data

US 2017/0139881 A1 May 18, 2017

(30) Foreign Application Priority Data

Nov. 12, 2015 (CN) .......................... 2015 1 0779067
Nov. 12, 2015 (CN) .......................... 2015 1 0779501

(51) Int. Cl.
*G06F 17/22* (2006.01)
*G06F 3/0481* (2013.01)
(Continued)

(52) U.S. Cl.
CPC ...... *G06F 17/2247* (2013.01); *G06F 3/04817* (2013.01); *G06F 3/04842* (2013.01); *G06F 3/04855* (2013.01)

(58) Field of Classification Search
None
See application file for complete search history.

(56) References Cited

U.S. PATENT DOCUMENTS

| | | | |
|---|---|---|---|
| 7,370,269 B1* | 5/2008 | Prabhu | ............. G06F 17/30873 715/201 |
| 2003/0081000 A1* | 5/2003 | Watanabe | ............. G06F 17/241 715/751 |

(Continued)

FOREIGN PATENT DOCUMENTS

| | | |
|---|---|---|
| CN | 103164456 | 6/2013 |
| CN | 103853761 | 6/2014 |

(Continued)

OTHER PUBLICATIONS

Office Action for CN App. No. 201510779067.4, dated Sep. 19, 2016, 15 pages.

(Continued)

*Primary Examiner* — Asher D Kells

(57) ABSTRACT

A method of displaying webpage comments is disclosed. The method may comprise sending a webpage browse request to a server, the webpage browse request comprising a webpage address. The method may also comprise receiving webpage information corresponding to the webpage address returned by the server, the webpage information comprising source code and a comment object information list, and each piece of comment object information in the comment object information list comprising position information of a webpage article element commented on by a user. The method may also comprise rendering and displaying a webpage article corresponding to the webpage address according to the source code comprised in the webpage information, and displaying webpage comments corresponding to the webpage address according to the comment object information list.

20 Claims, 6 Drawing Sheets

(51) Int. Cl.
  *G06F 3/0484* (2013.01)
  *G06F 3/0485* (2013.01)

(56) References Cited

U.S. PATENT DOCUMENTS

| | | | |
|---|---|---|---|
| 2006/0048046 | A1 | 3/2006 | Joshi et al. |
| 2009/0083383 | A1 | 3/2009 | Piper et al. |
| 2011/0191406 | A1* | 8/2011 | Plunkett ................. G06F 15/16 709/203 |
| 2013/0091419 | A1* | 4/2013 | Caliman ............... G06F 17/241 715/236 |
| 2013/0097481 | A1* | 4/2013 | Kotler .................. G06F 17/241 715/230 |
| 2014/0149883 | A1 | 5/2014 | Anand et al. |
| 2015/0066950 | A1* | 3/2015 | Tobe ...................... G06Q 50/01 707/748 |

FOREIGN PATENT DOCUMENTS

| | | |
|---|---|---|
| CN | 104239356 | 12/2014 |
| CN | 104487936 A | 4/2015 |
| CN | 104504131 A | 4/2015 |
| CN | 104899236 | 9/2015 |
| RU | 2475848 C2 | 2/2013 |

OTHER PUBLICATIONS

Office Action for CN App. No. 201510779067.4, dated Jan. 17, 2017, 16 pages.
Office Action for CN App. No. 201510779501.9, dated Sep. 19, 2016, 12 pages.
Office Action for CN App. No. 201510779501.9, dated Jan. 17, 2017 12 pages.
Office Action for Chinese Application No. 201510779067.4, dated Apr. 28, 2017, (with English Translation), 17 pages.
Office Action for Chinese Application No. 201510779501.9, dated May 3, 2017, (with English Translation), 16 pages.
Search Report for Russian Application No. 2016144330, dated Oct. 19, 2017, 2 pages.

* cited by examiner

DISPLAYING OF WEBPAGE COMMENTS IN AN ORDER ACCORDING TO THE NUMBER OF WEBPAGE COMMENTS

CROSS REFERENCE TO RELATED APPLICATIONS

The present application is based on and claims the benefit of priority to Chinese Application No. 201510779067.4, filed Nov. 12, 2015 and to Chinese Application No. 201510779501.9, filed Nov. 12, 2015, the entire contents of both of which are incorporated herein by reference.

TECHNICAL FIELD

The present disclosure relates generally to computer technologies, and more particularly, to methods and systems for displaying online comments.

BACKGROUND

At present, users often browse news and other webpage articles via an end-user browser. When a user browses a webpage, the end-user browser may display a webpage article and comments of the webpage at the same time, so that the user can browse other users' comments to the webpage article.

Currently, webpage comments include user IDs, comment time, and comment texts. When the user needs to browse a webpage comprising an article and associated comments, the end-user browser acquires source code and the comments of the webpage from a server according to the webpage's address, renders and displays the article according to the source code of the webpage, and displays the acquired comments in a comment area of the webpage.

Since the above webpage comments as displayed only include user IDs, comment time, and comment contents, they cannot reflect which part of the webpage article is commented on or referenced to. As a result, the user will find difficult to link the webpage comments to specific parts of the webpage article content, adversely affecting the reference value and readability of the webpage comments.

SUMMARY

One aspect of the present disclosure is directed to a method of displaying webpage comments. The method may comprise sending a webpage browse request to a server, the webpage browse request comprising a webpage address; receiving webpage information corresponding to the webpage address returned by the server, the webpage information comprising source code and a comment object information list, and each piece of comment object information in the comment object information list comprising position information of a webpage article element commented on by a user; and rendering and displaying a webpage article corresponding to the webpage address according to the source code comprised in the webpage information, and displaying webpage comments corresponding to the webpage address according to the comment object information list.

Another aspect of the present disclosure is directed to a method of displaying webpage comments. The method may comprise, when a comment event triggered by a comment trigger element in the webpage is detected, acquiring another piece of position information of an article element to be commented on corresponding to the comment event, comment information input by another user, and a user ID of the another user; generating another piece of comment object information according to the another piece of position information, the comment information, the user ID, and current time; and updating and displaying the comment object information in a comment area of the webpage.

Another aspect of the present disclosure is directed to a method of displaying webpage comments. The method may comprise receiving a webpage browse request sent by an end-user browser, the webpage browse request comprising a webpage address; acquiring webpage information corresponding to the webpage address according to the webpage address, the webpage information comprising source code and a comment object information list, and each piece of comment object information in the comment object information list comprising position information of a webpage article element commented on by a user; and sending the webpage information to the end-user browser, causing the end-user browser to display webpage comments corresponding to the webpage address according to the comment object information list.

Another aspect of the present disclosure is directed to a method of displaying webpage comments. The method may comprise receiving another webpage address and another piece of comment object information sent by the end-user browser, the another piece of comment object information comprising position information of an article element to be commented on; generating update information corresponding to the another webpage address according to the another piece of comment object information; determining, according to the another webpage address, an end-user browser that is accessing the another webpage address currently; and sending the update information to the determined end-user browser, causing the determined end-user browser to update a comment area of a webpage corresponding to the another webpage address according to the update information.

Another aspect of the present disclosure is directed to a device of displaying webpage comments. The device may comprise a processor and a non-transitory computer-readable memory storing instructions that, when executed by the processor, cause the processor to: send a webpage browse request to a server, the webpage browse request comprising a webpage address; receive webpage information corresponding to the webpage address returned by the server, the webpage information comprising source code and a comment object information list, and each piece of comment object information in the comment object information list comprising position information of a webpage article element commented on by a user; and render and display a webpage article corresponding to the webpage address according to the source code comprised in the webpage information, and display webpage comments corresponding to the webpage address according to the comment object information list.

Another aspect of the present disclosure is directed to a device of displaying webpage comments. The device may comprise a processor and a non-transitory computer-readable memory storing instructions that, when executed by the processor, cause the processor to: acquire, when a comment event triggered by a comment trigger element in the webpage is determined, position information of an article element to be commented on corresponding to the comment event, another piece of comment information input by a user, and a user ID of the user; generate another piece of comment object information according to the position information, the another piece of comment information, the user ID, and current time; and update and display the another piece of object information in a comment area of the webpage.

Another aspect of the present disclosure is directed to a non-transitory computer-readable storage medium storing instructions that, when executed by a device, causing the device to: send a webpage browse request to a server, the webpage browse request comprising a webpage address; receive webpage information corresponding to the webpage address returned by the server, the webpage information comprising source code and a comment object information list, and each piece of comment object information in the comment object information list comprising position information of a webpage article element commented on by a user; and render and display a webpage article corresponding to the webpage address according to the source code comprised in the webpage information, and display webpage comments corresponding to the webpage address according to the comment object information list.

Another aspect of the present disclosure is directed to a non-transitory computer-readable storage medium storing instructions that, when executed by a device, causing the device to: when a comment event triggered by a comment trigger element in the webpage is detected, acquire another piece of position information of an article element to be commented on corresponding to the comment event, comment information input by another user, and a user ID of the another user; generate another piece of comment object information according to the another piece of position information, the comment information, the user ID, and current time; and update and displaying the comment object information in a comment area of the webpage.

Another aspect of the present disclosure is directed to a device of displaying webpage comments. The device may comprise a receiving module, configured to receive a webpage browse request sent by an end-user browser, the webpage browse request comprising a webpage address; an acquisition module, configured to acquire webpage information corresponding to the webpage address according to the webpage address, the webpage information comprising source code and a comment object information list, and each piece of comment object information in the comment object information list comprising position information of a webpage article element commented on by a user; and a sending module, configured to send the webpage information to the end-user browser, causing the end-user browser to display webpage comments corresponding to the webpage address according to the comment object information list.

Another aspect of the present disclosure is directed to a device for displaying webpage comments. The device may comprise a receiving module, configured to receive another webpage address and another piece of comment object information sent by the end-user browser, the another piece of comment object information comprising position information of an article element to be commented on; a generation module, configured to generate update information corresponding to the another webpage address according to the another piece of comment object information; a determination module, configured to determine, according to the another webpage address, an end-user browser that is accessing the another webpage address currently; and a sending module, configured to send the update information to the determined end-user browser, causing the determined end-user browser to update a comment area of a webpage corresponding to the another webpage address according to the update information.

Another aspect of the present disclosure is directed to a non-transitory computer-readable storage medium storing instructions that, when executed by a device, causing the device to: acquire webpage information corresponding to the webpage address according to the webpage address, the webpage information comprising source code and a comment object information list, and each piece of comment object information in the comment object information list comprising position information of a webpage article element commented on by a user; and send the webpage information to the end-user browser, causing the end-user browser to display webpage comments corresponding to the webpage address according to the comment object information list.

Another aspect of the present disclosure is directed to a non-transitory computer-readable storage medium storing instructions that, when executed by the device, causing the device to: receive another webpage address and another piece of comment object information sent by the end-user browser, the another piece of comment object information comprising position information of an article element to be commented on; generate update information corresponding to the another webpage address according to the another piece of comment object information; determine, according to the another webpage address, an end-user browser that is accessing the another webpage address currently; and send the update information to the determined end-user browser, causing the determined end-user browser to update a comment area of a webpage corresponding to the another webpage address according to the update information.

In a first aspect, the embodiments of the present invention provide a method of displaying webpage comments, including:

sending a webpage browse request to a server, the webpage browse request including a webpage address;

receiving webpage information corresponding to the webpage address returned by the server, the webpage information including source code and a comment object information list, and each piece of comment object information in the comment object information list including position information of a webpage article element commented on by a user; and rendering and displaying a webpage article corresponding to the webpage address according to the source code included in the webpage information, and displaying webpage comments corresponding to the webpage address according to the comment object information list.

With reference to the first aspect, the embodiments of the present invention provide a first exemplary implementation of the first aspect, wherein the displaying webpage comments corresponding to the webpage address according to the comment object information list includes:

acquiring, from each piece of comment object information in the comment object information list, the position information included in each piece of comment object information respectively;

counting the number of comments corresponding to each piece of position information according to the position information included in each piece of comment object information; and displaying, in a comment area of a webpage corresponding to the webpage address, multiple pieces of comment object information in a preset comment popularity order according to the number of comments corresponding to each piece of position information, the multiple pieces of comment object information being included in the comment object information list.

With reference to the first aspect, the embodiments of the present invention provide a second exemplary implementation of the first aspect, wherein each piece of comment object information in the comment object information list further includes comment time; and the displaying webpage comments corresponding to the webpage address according to the comment object information list includes:

acquiring, from each piece of comment object information in the comment object information list, the comment time included in each piece of comment object information respectively; and displaying, in a comment area of the webpage, multiple pieces of comment object information in a preset chronological order according to the comment time included in each piece of comment object information, the multiple pieces of comment object information being included in the comment object information list.

With reference to the first aspect, the embodiments of the present invention provide a third exemplary implementation of the first aspect, wherein after the displaying webpage comments corresponding to the webpage address according to the comment object information list, the method further includes:

receiving update information sent by the server, the update information including a new comment object information list or new comment object information of the webpage;

updating all the comment object information displayed in the comment area according to the new comment object information list if the update information includes the new comment object information list; or displaying the new comment object information in the comment area in the preset chronological order or the preset comment popularity order if the update information includes the new comment object information.

With reference to the first aspect, the embodiments of the present invention provide a fourth exemplary implementation of the first aspect, wherein after the displaying webpage comments corresponding to the webpage address according to the comment object information list, the method further includes:

monitoring a comment title of each piece of comment object information displayed in the comment area, and when monitoring that the comment title of a piece of comment object information triggers a jump event, jumping to display the webpage article element corresponding to the position information included in the comment object information; and returning to display the comment object information in the comment area when a return event triggered by a return key is monitored.

With reference to the first aspect, the embodiments of the present invention provide a fifth exemplary implementation of the first aspect, wherein the webpage information further includes a comment number list that includes position information of webpage article elements in the webpage article and the number of comments; and the method further includes:

generating, from a start position of the webpage article, a hotspot distribution bar corresponding to the webpage article on the basis of a preset coloring strategy and according to the position information of the webpage article elements and the number of comments included in the comment number list; and embedding the hotspot distribution bar into a scroll bar of the webpage article, to obtain a popularity scroll bar corresponding to the webpage article.

With reference to the fifth exemplary implementation of the first aspect, the embodiments of the present invention provide a sixth exemplary implementation of the first aspect, wherein the method further includes:

receiving a comment number sorting list generated and sent by the server in a preset order, or generating the comment number sorting list in the preset order according to the comment number list; and setting a scroll operation event corresponding to a scroll control on the popularity scroll bar according to the comment number sorting list.

In a second aspect, the embodiments of the present invention provide a method of displaying webpage comments, including:

receiving a webpage browse request sent by a browser client, the webpage browse request including a webpage address;

acquiring webpage information corresponding to the webpage address according to the webpage address, the webpage information including source code and a comment object information list, and each piece of comment object information in the comment object information list including position information of a webpage article element commented on by a user; and sending the webpage information to the browser client, to cause the browser client to display webpage comments corresponding to the webpage address according to the comment object information list.

With reference to the second aspect, the embodiments of the present invention provide a first exemplary implementation of the second aspect, wherein the method further includes:

acquiring a comment number list corresponding to the webpage address according to the webpage address, and adding the comment number list to the webpage information; and generating the comment number sorting list corresponding to the webpage address in a preset order according to the comment number list, and sending the comment number sorting list to the browser client.

With reference to the second aspect, the embodiments of the present invention provide a second exemplary implementation of the second aspect, wherein the method further includes:

receiving the webpage address and the comment object information sent by the browser client;

generating update information corresponding to the webpage address according to the comment object information;

determining, according to the webpage address, a browser client that is accessing the webpage address currently; and sending the update information to the determined browser client, to cause the determined browser client to update and display the webpage comments corresponding to the webpage address according to the update information.

With reference to the second exemplary implementation of the second aspect, the embodiments of the present invention provide a third exemplary implementation of the second aspect, wherein the method further includes:

acquiring a comment number list corresponding to the webpage address according to the webpage address, and incrementing, according to position information included in the comment object information, the number of comments corresponding to the position information in the comment number list by one, to obtain a new comment number list; or acquiring source code of a webpage corresponding to the webpage address according to the webpage address, incrementing, according to position information included in the comment object information, a comment number attribute value of a webpage article element corresponding to the position information in the source code by one, and generating a new comment number list according to the source code after the operation of incrementing by one.

In a third aspect, the embodiments of the present invention provide a device of displaying webpage comments, the device including:

a sending module, configured to send a webpage browse request to a server, the webpage browse request including a webpage address;

a receiving module, configured to receive webpage information corresponding to the webpage address returned by the server, the webpage information including source code and a comment object information list, and each piece of comment object information in the comment object information list including position information of a webpage article element commented on by a user; and a display module, configured to render and display a webpage article corresponding to the webpage address according to the source code included in the webpage information, and display webpage comments corresponding to the webpage address according to the comment object information list.

With reference to the third aspect, the embodiments of the present invention provide a first exemplary implementation of the third aspect, wherein the display module includes:

a first acquisition unit, configured to acquire, from each piece of comment object information in the comment object information list, the position information included in each piece of comment object information respectively;

a counting unit, configured to count the number of comments corresponding to each piece of position information according to the position information included in each piece of comment object information; and a first display unit, configured to display, in a comment area of a webpage corresponding to the webpage address, multiple pieces of comment object information in a preset comment popularity order according to the number of comments corresponding to each piece of position information, the multiple pieces of comment object information being included in the comment object information list.

With reference to the third aspect, the embodiments of the present invention provide a second exemplary implementation of the third aspect, wherein each piece of comment object information in the comment object information list further includes comment time; and the display module includes:

a second acquisition unit, configured to acquire, from each piece of comment object information in the comment object information list, the comment time included in each piece of comment object information respectively; and a second display unit, configured to display, in a comment area of the webpage, multiple pieces of comment object information in a preset chronological order according to the comment time included in each piece of comment object information, the multiple pieces of comment object information being included in the comment object information list.

With reference to the third aspect, the embodiments of the present invention provide a third exemplary implementation of the third aspect, wherein the device further includes:

an update module, configured to receive update information sent by the server, the update information including a new comment object information list or new comment object information of the webpage; if the update information includes the new comment object information list, update all the comment object information displayed in the comment area according to the new comment object information list; or if the update information includes the new comment object information, display the new comment object information in the comment area in the preset chronological order or the preset comment popularity order.

With reference to the third aspect, the embodiments of the present invention provide a fourth exemplary implementation of the third aspect, wherein the device further includes:

a jump module, configured to monitor a comment title of each piece of comment object information displayed in the comment area, and when monitoring that the comment title of a piece of comment object information triggers a jump event, jumping to display the webpage article element corresponding to the position information included in the comment object information; and a return display module, configured to return to display the comment object information in the comment area when a return event triggered by a return key is monitored.

With reference to the third aspect, the embodiments of the present invention provide a fifth exemplary implementation of the third aspect, wherein the webpage information further includes a comment number list that includes position information of webpage article elements in the webpage article and the number of comments; and the device further includes:

a generation module, configured to generate, from a start position of the webpage article, a hotspot distribution bar corresponding to the webpage article on the basis of a preset coloring strategy and according to the position information of the webpage article elements and the number of comments included in the comment number list; and embed the hotspot distribution bar into a scroll bar of the webpage article, to obtain a popularity scroll bar corresponding to the webpage article.

With reference to the fifth exemplary implementation of the third aspect, the embodiments of the present invention provide a sixth exemplary implementation of the third aspect, wherein the device further includes:

a setting module, configured to receive a comment number sorting list generated and sent by the server in a preset order, or generate the comment number sorting list in the preset order according to the comment number list; and set a scroll operation event corresponding to a scroll control on the popularity scroll bar according to the comment number sorting list.

In a fourth aspect, the embodiments of the present invention provide a device of displaying webpage comments, the device including:

a receiving module, configured to receive a webpage browse request sent by a browser client, the webpage browse request including a webpage address;

an acquisition module, configured to acquire webpage information corresponding to the webpage address according to the webpage address, the webpage information including source code and a comment object information list, and each piece of comment object information in the comment object information list including position information of a webpage article element commented on by a user; and a sending module, configured to send the webpage information to the browser client, to cause the browser client to display webpage comments corresponding to the webpage address according to the comment object information list.

With reference to the fourth aspect, the embodiments of the present invention provide a first exemplary implementation of the fourth aspect, wherein the device further includes:

an adding module, configured to acquire a comment number list corresponding to the webpage address according to the webpage address, and add the comment number list to the webpage information;

the sending module being further configured to generate a comment number sorting list corresponding to the webpage address in a preset order according to the comment number list, and send the comment number sorting list to the browser client.

With reference to the fourth aspect, the embodiments of the present invention provide a second exemplary implementation of the fourth aspect, wherein the device further includes:

an update information generation module, configured to receive the webpage address and the comment object information sent by the browser client; generate update information corresponding to the webpage address according to the comment object information; determine, according to the webpage address, a browser client that is accessing the webpage address currently; and send the update information to the determined browser client, to cause the determined browser client to update and display the webpage comments corresponding to the webpage address according to the update information.

With reference to the second exemplary implementation of the fourth aspect, the embodiments of the present invention provide a third exemplary implementation of the fourth aspect, wherein the device further includes:

a comment number modification module, configured to acquire a comment number list corresponding to the webpage address according to the webpage address, and increment, according to position information included in the comment object information, the number of comments corresponding to the position information in the comment number list by one, to obtain a new comment number list; or acquire source code of a webpage corresponding to the webpage address according to the webpage address, increment, according to position information included in the comment object information, a comment number attribute value of a webpage article element corresponding to the position information in the source code by one, and generate a new comment number list according to the source code after the operation of incrementing by one.

In a fifth aspect, the embodiments of the present invention provide a terminal, the terminal including:

a sender, configured to send a webpage browse request to a server, the webpage browse request including a webpage address;

a receiver, configured to receive webpage information corresponding to the webpage address returned by the server, the webpage information including source code and a comment object information list, and each piece of comment object information in the comment object information list including position information of a webpage article element commented on by a user;

a processor, configured to render a webpage article corresponding to the webpage address according to the source code included in the webpage information, and render webpage comments corresponding to the webpage address according to the comment object information list; and a display, configured to display the webpage article and the webpage comments corresponding to the webpage address.

In a sixth aspect, the embodiments of the present invention provide a server, the server including:

a receiver, configured to receive a webpage browse request sent by a browser client, the webpage browse request including a webpage address;

a processor, configured to acquire webpage information corresponding to the webpage address according to the webpage address, the webpage information including source code and a comment object information list, and each piece of comment object information in the comment object information list including position information of a webpage article element commented on by a user; and a sender, configured to send the webpage information to the browser client, to cause the browser client to display webpage comments corresponding to the webpage address according to the comment object information list.

In the method, the device, the terminal, and the server provided in the embodiments of the present invention, each piece of comment object information in a comment object information list includes position information of a webpage article element commented on by a user; and webpage comments corresponding to a webpage address are rendered and displayed according to the comment object information list. The webpage comments displayed in this manner can reflect which part of content is commented on by users, such that the webpage comments can be understood in combination with the webpage article elements, thereby improving the reference and understandability of the webpage comments.

The aspects described below (system, method, or device) may be incorporated with the aspects described above correspondingly. For example, the first aspect above and be combined with the first aspect below.

In a first aspect, embodiments of the present invention provide a method for webpage comments, the method including:

acquiring, when a comment event triggered by a comment trigger element in a webpage is monitored, position information of an article element to be commented on corresponding to the comment event, comment information input by a user, and a user ID of the user;

generating comment object information according to the position information, the comment information, the user ID, and current time; and updating and displaying the comment object information in a comment area of the webpage.

With reference to the first aspect, the embodiments of the present invention provide a first exemplary implementation of the first aspect, wherein the comment trigger element includes a comment tracking button; and before the acquiring position information of an article element to be commented on corresponding to the comment event, comment information input by a user, and a user ID of the user, the method further includes:

monitoring in real time the comment tracking button in the webpage, and determining, when a single click event of the comment tracking button is monitored, that the comment tracking button triggers a comment event; and/or the comment trigger element includes all webpage article elements currently displayed in a screen display area, and the method further includes:

monitoring in real time all the webpage article elements, and determining, when a long press event of a webpage article element in all the webpage article elements is monitored, that the webpage article element triggers a comment event.

With reference to the first exemplary implementation of the first aspect, the embodiments of the present invention provide a second exemplary implementation of the first aspect, wherein when the single click event of the comment tracking button is monitored, the acquiring position information of an article element to be commented on corresponding to the comment event includes:

acquiring, from the screen display area, a currently displayed webpage article paragraph as the article element to be commented on corresponding to the comment event; and generating, according to source code of the webpage and the article element to be commented on, the position information of the article element to be commented on.

With reference to the first exemplary implementation of the first aspect, the embodiments of the present invention provide a third exemplary implementation of the first aspect, wherein when the long press event of the webpage article element in all the webpage article elements is monitored, the acquiring position information of an article element to be commented on corresponding to the comment event includes:

determining the webpage article element, of which the long press event is monitored, as the article element to be commented on corresponding to the comment event; and generating, according to source code of the webpage and the article element to be commented on, the position information of the article element to be commented on.

With reference to the first aspect, the embodiments of the present invention provide a fourth exemplary implementation of the first aspect, wherein the generating, according to source code of the webpage and the article element to be commented on, the position information of the article element to be commented on includes:

querying whether the source code of the webpage includes a Hyper Text Markup Language (HTML) object ID of the article element to be commented on;

if yes, acquiring, from the source code, the HTML object ID of the article element to be commented on as the position information of the article element to be commented on; or if no, assigning a unique ID to the article element to be commented on, and determining the assigned unique ID as the position information of the article element to be commented on.

With reference to the first aspect, the embodiments of the present invention provide a fifth exemplary implementation of the first aspect, wherein the generating comment object information according to the position information, the comment information, the user ID, and current time includes:

determining the current time as comment time corresponding to the article element to be commented on;

generating, via a preset title strategy according to the position information, the comment information, the user ID, and the comment time, a comment title corresponding to the article element to be commented on; and generating the comment object information according to the position information, the comment information, the user ID, the comment title, and the comment time.

With reference to the first aspect, the embodiments of the present invention provide a sixth exemplary implementation of the first aspect, wherein the method further includes:

monitoring in real time a comment adding trigger element corresponding to each piece of comment object information in the comment area of the webpage;

acquiring, when an adding event triggered by a comment adding trigger element corresponding to a piece of comment object information is monitored, position information included in the comment object information triggering the adding event, comment information added by a user, and a user ID of the user, and generating added comment object information; and updating and displaying the added comment object information in the comment area of the webpage.

With reference to the first aspect, the embodiments of the present invention provide a seventh exemplary implementation of the first aspect, wherein the updating and displaying the comment object information in a comment area of the webpage includes:

sending a webpage address of the webpage and the comment object information to a server, to cause the server to update the comment object information for all browser clients that are displaying the webpage currently.

In a second aspect, the embodiments of the present invention provide a method for webpage comments, the method including:

receiving a webpage address and comment object information sent by a browser client, the comment object information including position information of an article element to be commented on;

generating update information corresponding to the webpage address according to the comment object information;

determining, according to the webpage address, a browser client that is accessing the webpage address currently; and sending the update information to the determined browser client, to cause the determined browser client to update a comment area of a webpage corresponding to the webpage address according to the update information.

With reference to the second aspect, the embodiments of the present invention provide a first exemplary implementation of the second aspect, wherein the generating update information corresponding to the webpage address according to the comment object information includes:

adding the comment object information to a comment object information list corresponding to the webpage address to obtain a new comment object information list, and using the new comment object information list as the update information corresponding to the webpage address; or determining directly the received comment object information as the update information corresponding to the webpage address.

In a third aspect, the embodiments of the present invention provide a device for webpage comments, the device including:

an acquisition module, configured to acquire, when the comment event triggered by a comment trigger element in a webpage is monitored, position information of an article element to be commented on corresponding to a comment event, comment information input by a user, and a user ID of the user;

a generation module, configured to generate comment object information according to the position information, the comment information, the user ID, and current time; and an update module, configured to update and display the comment object information in a comment area of the webpage.

With reference to the third aspect, the embodiments of the present invention provide a first exemplary implementation of the third aspect, wherein the comment trigger element includes a comment tracking button; and the device further includes:

a first determination module, configured to monitor in real time the comment tracking button in the webpage, and determine, when a single click event of the comment tracking button is monitored, that the comment tracking button triggers a comment event; or the comment trigger element includes all webpage article elements currently displayed in a screen display area, and the device further includes:

a second determination module, configured to monitor in real time all the webpage article elements, and determining, when a long press event of a webpage article element in all the webpage article elements is monitored, that the webpage article element triggers a comment event.

With reference to the first exemplary implementation of the third aspect, the embodiments of the present invention provide a second exemplary implementation of the third aspect, wherein when the single click event of the comment tracking button is monitored, the acquisition module includes:

an acquisition unit, configured to acquire, from the screen display area, a currently displayed webpage article paragraph as the article element to be commented on corresponding to the comment event; and a first generation unit, configured to generate, according to source code of the webpage and the article element to be commented on, the position information of the article element to be commented on.

With reference to the first exemplary implementation of the third aspect, the embodiments of the present invention provide a third exemplary implementation of the third aspect, wherein when the long press event of the webpage article element in all the webpage article elements is monitored, the acquisition module includes:

a first determination unit, configured to determine the webpage article element, of which the long press event is monitored, as the article element to be commented on corresponding to the comment event; and a first generation unit, configured to generate, according to source code of the webpage and the article element to be commented on, the position information of the article element to be commented on.

With reference to the third aspect, the embodiments of the present invention provide a fourth exemplary implementation of the third aspect, wherein the first generation unit includes:

a query subunit, configured to query whether the source code of the webpage includes a Hyper Text Markup Language (HTML) object ID of the article element to be commented on;

an acquisition subunit, configured to acquire, from the source code when the query subunit finds that the source code of the webpage includes the HTML object ID of the article element to be commented on, the HTML object ID of the article element to be commented on as the position information of the article element to be commented on; and an assignment subunit, configured to assign, when the query subunit finds that the source code of the webpage does not include the HTML object ID of the article element to be commented on, a unique ID to the article element to be commented on, and determine the assigned unique ID as the position information of the article element to be commented on.

With reference to the third aspect, the embodiments of the present invention provide a fifth exemplary implementation of the third aspect, wherein the generation module includes:

a second determination unit, configured to determine the current time as comment time corresponding to the article element to be commented on;

a second generation unit, configured to generate, via a preset title strategy according to the position information, the comment information, the user ID, and the comment time, a comment title corresponding to the article element to be commented on; and a third generation unit, configured to generate the comment object information according to the position information, the comment information, the user ID, the comment title, and the comment time.

With reference to the third aspect, the embodiments of the present invention provide a sixth exemplary implementation of the third aspect, wherein the device further includes:

a comment adding module, configured to monitor in real time a comment adding trigger element corresponding to each piece of comment object information in the comment area of the webpage; acquire, when an adding event triggered by a comment adding trigger element corresponding to a piece of comment object information is monitored, position information included in the comment object information triggering the adding event, comment information added by a user, and a user ID of the user, and generate added comment object information; and update and display the added comment object information in the comment area of the webpage.

With reference to the third aspect, the embodiments of the present invention provide a seventh exemplary implementation of the third aspect, wherein the update module is configured to send a webpage address of the webpage and the comment object information to a server, to cause the server to update the comment object information for all browser clients that are displaying the webpage currently.

In a fourth aspect, the embodiments of the present invention provide a device for webpage comments, the device including:

a receiving module, configured to receive a webpage address and comment object information sent by a browser client, the comment object information including position information of an article element to be commented on;

a generation module, configured to generate update information corresponding to the webpage address according to the comment object information;

a determination module, configured to determine, according to the webpage address, a browser client that is accessing the webpage address currently; and a sending module, configured to send the update information to the determined browser client, to cause the determined browser client to update a comment area of a webpage corresponding to the webpage address according to the update information.

With reference to the fourth aspect, the embodiments of the present invention provide a first exemplary implementation of the fourth aspect, wherein the generation module includes:

an adding unit, configured to add the comment object information to a comment object information list corresponding to the webpage address to obtain a new comment object information list, and use the new comment object information list as the update information corresponding to the webpage address; or a determination unit, configured to directly determine the received comment object information as the update information corresponding to the webpage address.

In a fifth aspect, a terminal is provided, the terminal including: a processor and a display, the processor being configured to acquire, when a comment event triggered by a comment trigger element in a webpage displayed by the display is monitored, position information of an article element to be commented on corresponding to the comment event, comment information input by a user, and a user ID of the user; generate comment object information according to the position information, the comment information, the user ID, and current time; and update and display the comment object information in a comment area of the webpage.

In a sixth aspect, a server is provided, the server including:

a receiver, configured to receive a webpage address and comment object information sent by a browser client, the comment object information including position information of an article element to be commented on;

a processor, configured to generate update information corresponding to the webpage address according to the comment object information; and determine, according to the webpage address, a browser client that is accessing the webpage address currently; and a sender, configured to send the update information to the determined browser client, to cause the determined browser client to update a comment area of a webpage corresponding to the webpage address according to the update information.

In the method, the device, the terminal and the server provided in the embodiments of the present invention, when a comment event triggered by a comment trigger element in a webpage is monitored, position information of an article element to be commented on corresponding to the comment event, comment information input by a user, and a user ID of the user are acquired; comment object information is generated according to the position information, the comment information, the user ID, and current time; and the comment object information is updated and displayed in a comment area of the webpage. In the present invention, comment object information is generated according to position information of an article element to be commented on, and which part of content is commented on by a user can be reflected by the comment object information, such that the comment object information of the user's comment can be understood in combination with the article element to be commented on, thereby improving the reference and understandability of the comment object information.

It is to be understood that the foregoing general description and the following detailed description are exemplary and explanatory only, and are not restrictive of the invention, as claimed.

BRIEF DESCRIPTION OF THE DRAWINGS

The accompanying drawings, which constitute a part of this disclosure, illustrate several embodiments and, together with the description, serve to explain the disclosed principles.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments consistent with the present invention do not represent all implementations consistent with the invention. Instead, they are merely examples of systems and methods consistent with aspects related to the invention. All other embodiments derived by persons of ordinary skill in the art based on the embodiments of the present disclosure without any creative efforts should fall within the protection scope of the present disclosure. The embodiments described herein may be modified or combined.

When a webpage comment solution of the present disclosure is conceived, the following issues are taken into consideration: in the prior art, a displayed webpage comment includes only a user ID, comment time, and comment texts, and the webpage comment cannot reflect which part/parts of the webpage article is/are commented on or referenced to. As a result, a user may not comprehend the webpage comment in relation to the webpage article, thus adversely affecting the reference value and the readability of the webpage comment. onto solve this problem, the embodiments of the present disclosure provide methods, devices, terminals, and servers for displaying webpage comments.

Figure 1A:
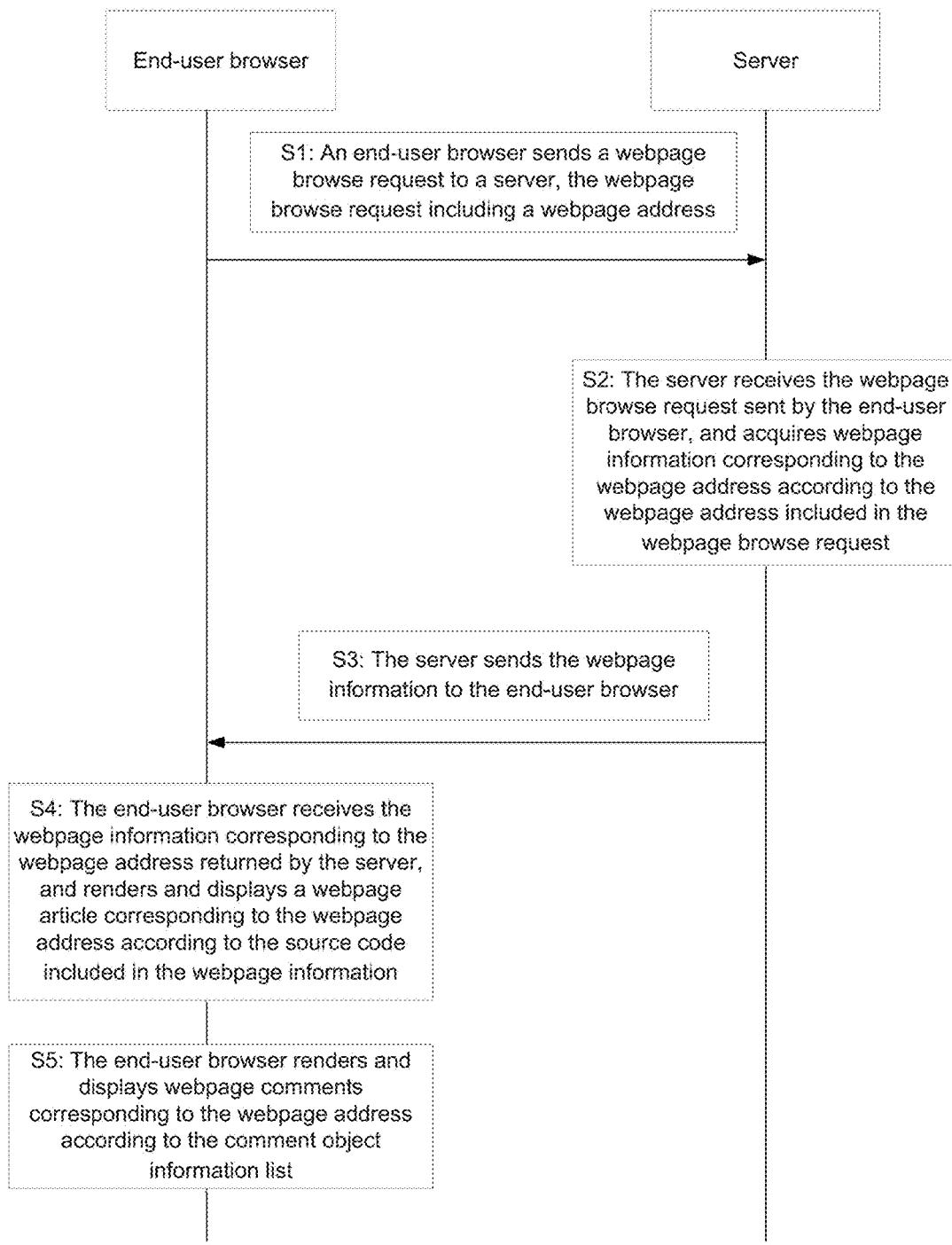
FIG. 1A is a flow diagram illustrating a method for displaying webpage comments, consistent with exemplary embodiments of the present disclosure.

As shown in FIG. 1A, the embodiments of the present disclosure provide a method 100 of displaying webpage comments, and the method 100 includes the following steps:

S1: An end-user browser sends a webpage browse request to a server, the webpage browse request including a webpage address.

When a user needs to browse a webpage, the user may click a hyperlink corresponding to the webpage. When detecting a browse instruction triggered from the hyperlink, an end-user browser acquires a webpage address of the webpage, and sends a webpage browse request to a server, the webpage browse request carrying the webpage address of the webpage.

S2: The server receives the webpage browse request sent by the end-user browser, and acquires webpage information corresponding to the webpage address according to the webpage address included in the webpage browse request.

The webpage information includes source code and a comment object information list of the webpage. The comment object information list includes multiple pieces of comment object information in the webpage, that is, comment object information generated by all users commenting on the webpage article of the webpage. In one embodiment of the present disclosure, the comment object information includes position information of a webpage article element commented by a user, comment information of the user's comment, a user ID, a comment title, and comment time.

The comment information of the user's comment may be a comment text, a picture, an emoji image, or the like input by the user.

In one embodiment of the present disclosure, the server stores corresponding relationships among webpage addresses, source code, and a comment object information list of each webpage. The server receives a webpage browse request sent by an end-user browser, acquires, according to the corresponding relationships, the corresponding source code and comment object information list according to the webpage address included in the webpage browse request, and generates webpage information corresponding to the webpage address according to the acquired source code and comment object information list. In one embodiment of the present disclosure, the acquired source code and comment object information list can directly form the webpage information corresponding to the webpage address.

S3: The server sends the webpage information to the end-user browser.

S4: The end-user browser receives the webpage information corresponding to the webpage address returned by the server, and renders and displays a webpage article corresponding to the webpage address according to the source code included in the webpage information.

S5: The end-user browser renders and displays webpage comments corresponding to the webpage address according to the comment object information list.

In addition to the webpage article, the webpage corresponding to the webpage address further includes a comment area. The webpage comments are displayed in the comment area of the webpage corresponding to the webpage address.

In one embodiment of the present disclosure, the webpage comments in the comment area may be displayed according to different display strategies, and the webpage comments are the comment object information included in the comment object information list. In one embodiment of the present disclosure, the comment object information may be displayed in chronological order or in a comment popularity order. The comment popularity may be associated with a number of comments made, and the comment popularity order may be an order of the numbers of comments to the webpage article elements.

The operation of rendering and displaying a comment area of the webpage in the comment popularity order by the end-user browser includes:

acquiring, by the end-user browser, from each piece of comment object information in the comment object information list, the position information included in each piece of comment object information respectively; counting the number of comments corresponding to each piece of position information according to the position information included in each piece of comment object information; and using the number of comments corresponding to each piece of position information as the comment popularity corresponding to each piece of position information, and displaying, in the comment area of the webpage, multiple pieces of comment object information in a preset comment popularity order, the multiple pieces of comment object information being included in the comment object information list.

In one embodiment of the present disclosure, when multiple pieces of comment object information corresponding to different position information and with the same number of comments are displayed, the multiple pieces of comment object information are displayed in chronological order of comment time.

The preset comment popularity order may be a descending order of comment popularity, or an ascending order of comment popularity. In one embodiment of the present disclosure, the preset comment popularity order is preferably a descending order of comment popularity, because a webpage article element corresponding to comment object information with high comment popularity is usually an element such as a popular paragraph or picture in the webpage article, such that users also hope to first see the comment object information with high comment popularity. Therefore, the descending order of comment popularity is more in line with the reading habits of users, thus improving the user experience.

Figure 1C:
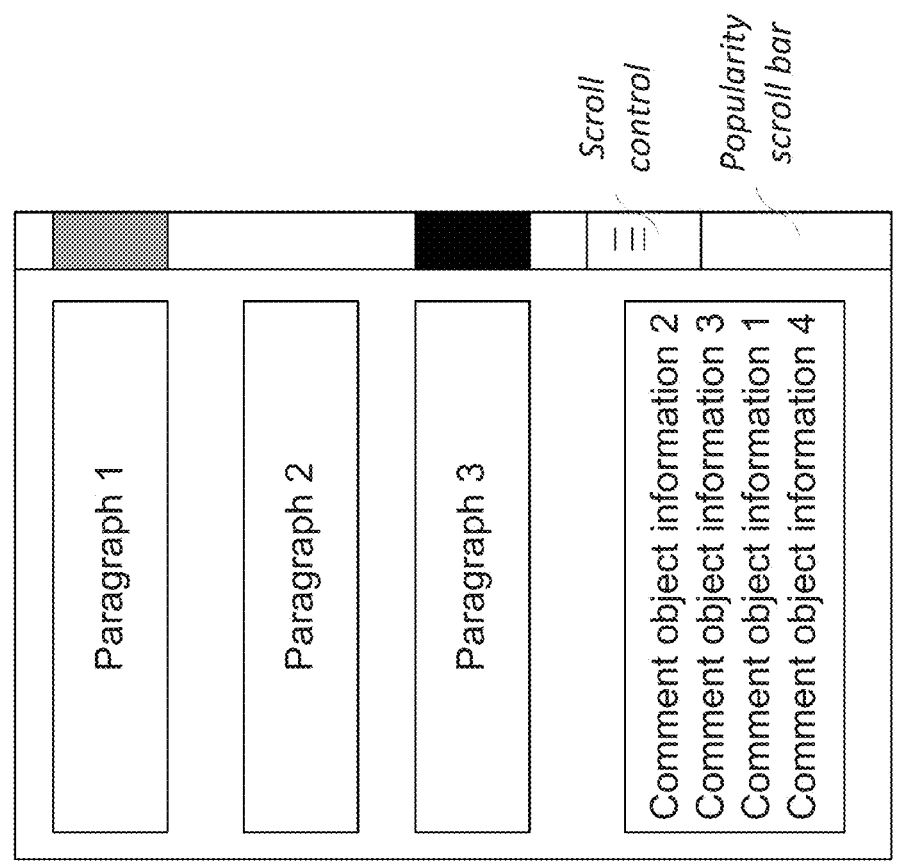
FIG. 1C is a schematic diagram illustrating another webpage for displaying comments, consistent with exemplary embodiments of the present disclosure.
Figure 1B:
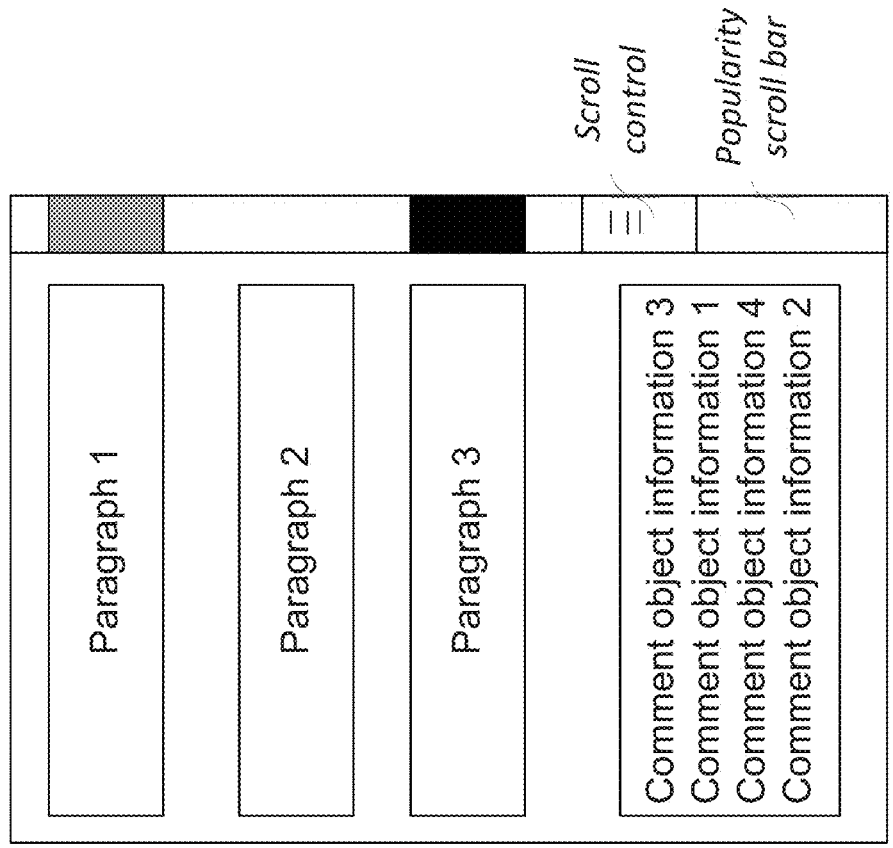
FIG. 1B is a schematic diagram illustrating a webpage for displaying comments, consistent with exemplary embodiments of the present disclosure.

To help readers understand the operation of displaying the comment area in the comment popularity order, description is given below by using an example. For example, in the webpage as shown in FIG. 1B, the comment object information 1, 3, and 4 are all comments corresponding to Paragraph 3 of an article, and the comment object information 2 is a comment corresponding to Paragraph 1 of the article. In this case, when the comment area is displayed according to the comment popularity order, the comment object information 1, 3, and 4 are displayed before the comment object information 2. The comment object information 1, 3, and 4 are displayed sequentially as comment object information 3, 1, and 4 in chronological order of comment time.

The operation of rendering and displaying a comment area of the webpage in chronological order by the end-user browser includes:

acquiring, by the end-user browser, from each piece of comment object information in the comment object information list, the comment time included in each piece of comment object information respectively; and displaying, in the comment area of the webpage, multiple pieces of comment object information in a preset chronological order according to the comment time included in each piece of comment object information, the multiple pieces of comment object information being included in the comment object information list.

Multiple pieces of different comment object information with the same comment time are displayed in a preset popularity comment order during the display of the multiple pieces of different comment object information.

The preset chronological order is related to an order of time differences between the comment time included in the comment object information and the current time, that is, the preset chronological order may be a descending order of the time differences between the comment time and the current time or an ascending order of the time differences between the comment time and the current time. In one embodiment of the present disclosure, the preset chronological order is preferably an ascending order of the time differences between the comment time and the current time, that is, comment object information closer to the current time is displayed in the front part of the comment area, while comment object information further from the current time is displayed in the later part of the comment area. As the user pays more attention to comment object information about other users' current comments on the webpage article, the ascending order of the time differences between the comment time and the current time is more in line with the reading habits of the users, thus improving the user experience.

To help readers understand the operation of displaying the comment area in the preset chronological order, description is given below by using an example. For example, in the webpage as shown in FIG. 1C, assuming that the current time is 9:00 of October 1, assuming that the preset chronological order is an ascending order of the time differences between the comment time and the current time, and assuming that the comment time of the comment object information 1, 2, 3, and 4 are 8:00 of October 1, 12:00 of September 30, 10:00 of September 30, and 20:00 of September 30 respectively, the comment object information 2, 3, 1, and 4 are sequentially displayed in the comment area in the preset chronological order.

In one embodiment of the present disclosure, the server further records the number of comments corresponding to each webpage article element of the webpage, the webpage article element may be a paragraph, a picture, a chart, or the like in the webpage article, and the server arranges the position information and the number of comments of each webpage article element into a comment number list corresponding to the webpage. The position information of the webpage article element identifies the position of the webpage article element in the webpage article, and the position information of the webpage article element may be represented by a unique ID of the webpage article element in the webpage article. The server stores the webpage address and the comment number list of the webpage in a corresponding relationship between webpage addresses and comment number lists.

In step S2, after the server receives the browse request sent by the end-user browser, the server further acquires, according to the webpage address included in the browse request, a corresponding comment number list from the stored corresponding relationship between webpage addresses and comment number lists, and sends the acquired comment number list to the end-user browser.

The end-user browser receives the comment number list sent by the server, and generates a popularity scroll bar corresponding to the webpage article according to the comment number list. The operation of generating a popularity scroll bar includes:

generating, by the end-user browser from a start position of the webpage article, a hotspot distribution bar corresponding to the webpage article on the basis of a preset coloring strategy and according to the position information of the webpage article elements and the number of comments included in the comment number list; and embedding the hotspot distribution bar into a scroll bar of the webpage article, to obtain the popularity scroll bar corresponding to the webpage article.

The preset coloring strategy stipulates the color used for generating the hotspot distribution bar and a chromaticity (e.g., color saturation) change strategy of the color at positions corresponding to different popularities. For example, the preset coloring strategy may stipulate that the red color is used, and the red color at a position with higher popularity has a higher chromaticity (more saturated red), while the red color at a position with lower popularity has a lower chromaticity (less saturated red).

The color in the popularity scroll bar is used for prompting the user a hotspot condition of the webpage article elements, the color is one type of prompt information to indicate a hot/popular part of the article, but it is not limited in the embodiments of the present disclosure that the prompt information for prompting the hotspot condition is color, and the prompt information may also be a text, an image, or in other forms.

In one embodiment of the present disclosure, entries included in the comment number list are preferably arranged according to the order of the position information of the webpage article elements in the webpage article. The end-user browser acquires, according to the order of the position information, the position information of the webpage article element and the number of comments from the comment number list; uses the number of comments as the popularity corresponding to the webpage article element; and colors, from the start point of the webpage article, positions corresponding to the position information of the webpage article elements in the hotspot distribution bar according to a preset coloring strategy. The higher the popularity corresponding to the webpage article element is, the deeper (more saturated) the color of the position corresponding to the position information of the webpage article element in the hotspot distribution bar is. The lower the popularity corresponding to the webpage article element is, the lighter (less saturated) the color of the position corresponding to the position information of the webpage article element in the hotspot distribution bar is. The hotspot distribution bar corresponding to the webpage article may be generated as described, and the hotspot distribution bar may be embedded into the scroll bar of the webpage, to obtain the popularity scroll bar corresponding to the webpage article.

The hotspot condition of each webpage article element in the webpage article can be prompted to the user through the popularity scroll bar, and a hot spot distribution of the webpage article is indicated intuitively and clearly.

In order to help readers understand the generated popularity scroll bar more intuitively, description is given below in combination with the drawings. As the webpage shown in FIG. 1B and FIG. 1C, assuming that the preset coloring strategy stipulates that the popularity is identified with different levels of gray, and in the webpage article of the webpage, the number of comments to Paragraph 3 is 3, the number of comments to Paragraph 1 is 1, the number of comments to Paragraph 2 is 0. Therefore, the popularity of Paragraph 3 is the highest, and the position on the popularity scroll bar corresponding to Paragraph 3 is black; the popularity of Paragraph 1 is the second highest, and the position on the popularity scroll bar corresponding to Paragraph 1 is gray; and the popularity of Paragraph 2 is the lowest, and the position on the popularity scroll bar corresponding to Paragraph 2 is white.

In one embodiment of the present disclosure, the server further sorts the acquired comment number list in a preset order, to obtain a comment-number-sorted list corresponding to the webpage address, and sends the comment-number-sorted list to the end-user browser.

The preset order may be a descending order of the numbers of comments or an ascending order of the numbers of comments. In one embodiment of the present disclosure, the comment number list is preferably sorted in descending order of the numbers of comments.

In addition, the server may not generate and deliver the comment-number-sorted; instead, after receiving the comment number list sent by the server, the end-user browser sorts the comment number list in a preset order, to obtain the comment-number-sorted.

The end-user browser generates a popularity scroll bar corresponding to the webpage article, and receives the comment-number-sorted list generated and sent by the server in a preset order. Alternatively, after generating the comment-number-sorted list according to the comment number list in a preset order, the end-user browser further sets a scroll operation event corresponding to a scroll control on the popularity scroll bar according to the comment-number-sorted.

The scroll operation event may be an operation corresponding to a trigger event of the scroll control on the popularity scroll bar. For example, according to the comment-number-sorted, it may be set that an operation corresponding to a first double-click event triggered by the scroll control is scrolling to display a webpage article element with the greatest number of comments, an operation corresponding to a second double-click event triggered by the scroll control is scrolling to display a webpage article element with the second greatest number of comments, and so on. In a descending order of the numbers of comments, the webpage article elements in the comment-number-sorted list may be sequentially numbered as 1, 2, . . . , n, and it may be set that each double-click event of the scroll control corresponds to scrolling display of a webpage article element whose serial number is equal to the number of double clicks.

In one embodiment of the present disclosure, a redirect number threshold may also be set. When the number of redirects that the user performs by double-clicking the scroll control exceeds the redirect number threshold, redirect states of the scroll control are cleared, and the scroll control may redirect to display the webpage article element with the greatest number of comments. A comment number threshold may also be set. When the number of comments corresponding to the webpage article element, which is displayed upon a redirect after the user double-clicks the scroll control, is less than the comment number threshold, redirect states of the scroll control are cleared, and the scroll control may redirect to display the webpage article element with the greatest number of comments. The redirect states of the scroll control are the number of performed redirects of the scroll control.

In addition, it may be set that an operation corresponding to a long press event of the scroll control is returning to the beginning of the webpage article or redirecting to the paragraph with the highest popularity in the webpage article, and the redirect states of the scroll control are cleared when the long press event occurs.

In one embodiment of the present disclosure, after the popularity scroll bar corresponding to the webpage article is generated and the scroll operation event of the scroll control is set, the end-user browser monitors the scroll control on the popularity scroll bar in real time, and when determining a scroll operation event triggered by the scroll control, performs a scroll operation corresponding to the set scroll operation event.

For example, as the webpage shown in FIG. 1B and FIG. 1C, if the user double-clicks the scroll control for the first time, Paragraph 3 is displayed via scrolling, if the user double-clicks the scroll control for the second time, Paragraph 1 is displayed via scrolling, and if the user double-clicks the scroll control for the third time, Paragraph 2 is displayed via scrolling.

In one embodiment of the present disclosure, after the end-user browser displays the webpage article and the webpage comments of the webpage, the user can browse the webpage article of the webpage, and when browsing the webpage article of the webpage, the user may comment on a webpage article element. At this point, the end-user browser generates new comment object information according to the user's comment, and updates and displays the webpage comments of the webpage according to the new comment object information.

In one embodiment of the present disclosure, the end-user browser may first locally display the generated comment object information in the comment area of the webpage currently displayed, and at the same time, send the comment object information to the server. After receiving the comment object information, the server determines other end-user browsers that are displaying the webpage currently, and the server sends the comment object information to the determined other end-user browsers, to cause the other end-user browsers to update and display the comment object information in the comment area of the webpage.

In this way, when the user's comment generates comment object information, the comment object information is immediately displayed locally in the comment area of the webpage. The local display has no time delay, which improves the user experience. In addition, the end-user browser and other end-user browsers update and display the comment object information in a preset chronological order or a preset comment popularity order, and a display manner adopted is the same as that for displaying the comment area of the webpage in step S5.

As comment object information generated when users make comments sometimes may include content violating related law regulations, it is necessary to examine the comment object information before updating and displaying the comment object information. Therefore, in one embodiment of the present disclosure, the end-user browser may not immediately display the generated comment object information in the comment area of the webpage locally, but first send the comment object information to the server. The server receives the comment object information, and after the comment object information is examined and approved by an examiner or after the server automatically carries out a semantic analysis, and examines and approves the comment object information, the server determines all end-user browsers displaying the webpage currently and sends the comment object information to each of the determined end-user browsers. Each end-user browser currently displaying the webpage receives the comment object information sent by the server and displays the comment object information in the comment area of the webpage that the end-user browser is displaying currently.

Figure 1D:
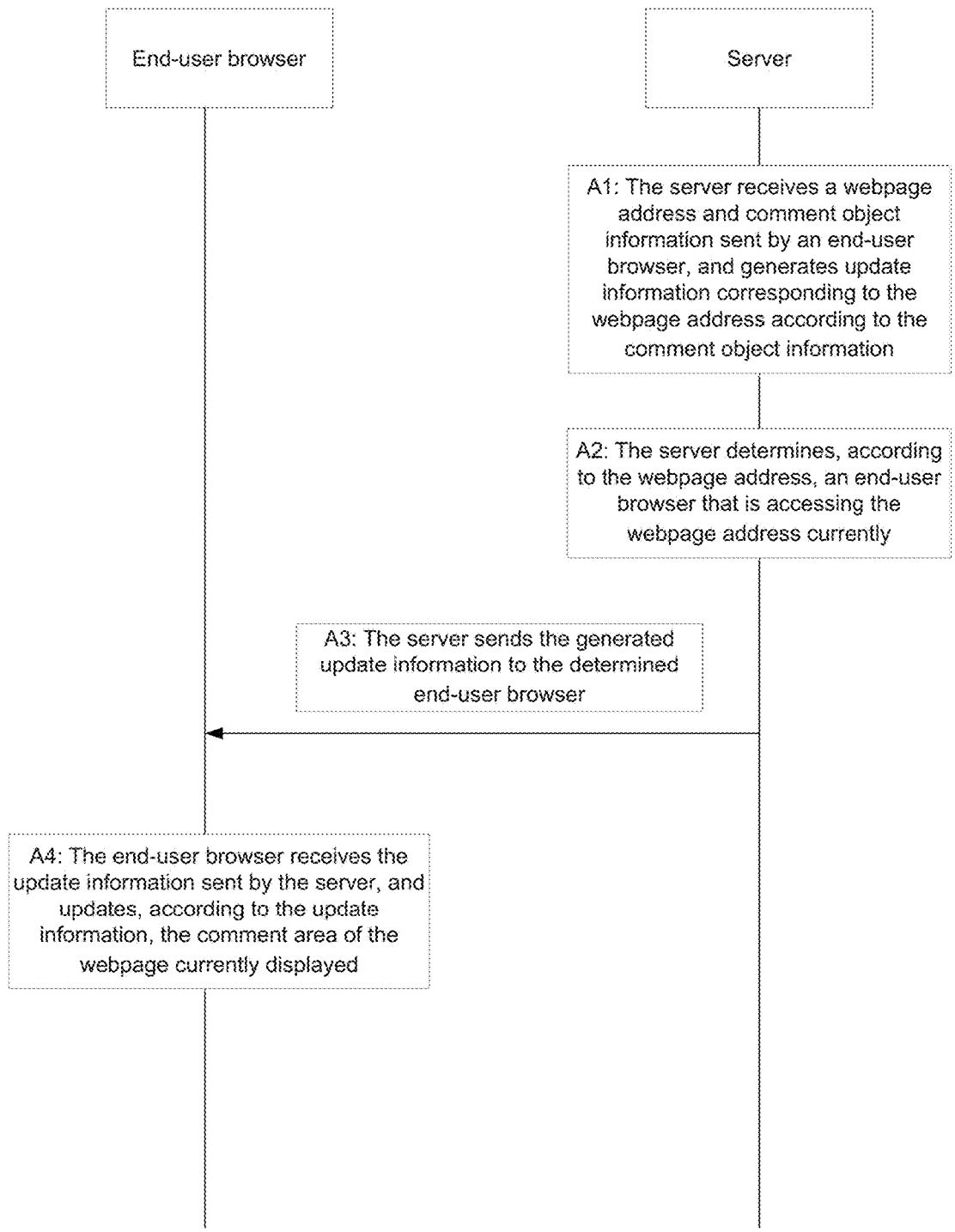
FIG. 1D is a flow diagram illustrating a method for displaying webpage comments, consistent with exemplary embodiments of the present disclosure.

In one embodiment of the present disclosure, when the user makes a comment to generate comment object information, and the comment object information is displayed and updated to other users through the server, as shown in FIG. 1D, the comment object information is updated and displayed via the operations of steps A1-A4 as follows.

A1: The server receives a webpage address and comment object information sent by an end-user browser, and generates update information corresponding to the webpage address according to the comment object information.

The server adds the comment object information to a comment object information list corresponding to the webpage address to obtain a new comment object information list, and uses the new comment object information list as the update information corresponding to the webpage address; or the server directly determines the received comment object information as the update information corresponding to the webpage address.

A2: The server determines, according to the webpage address, an end-user browser that is accessing the webpage address currently.

When the end-user browser requests to access a webpage address, the end-user browser further sends its own ID to the server, and the server records a corresponding relationship between the webpage address and the ID of the end-user browser.

The server acquires the ID of the corresponding end-user browser from the corresponding relationship between the webpage address and the ID of the end-user browser according to the webpage address, and determines the end-user browser corresponding to the acquired ID as the end-user browser that is accessing the webpage address currently.

A3: The server sends the generated update information to the determined end-user browser.

A4: The end-user browser receives the update information sent by the server, and updates, according to the update information, the comment area of the webpage currently displayed.

The end-user browser receives the update information sent by the server, and the update information includes a new comment object information list or new comment object information of the webpage. If the update information includes the new comment object information list, all the comment object information displayed in the comment area is updated according to the new comment object information list; or if the update information includes only the new comment object information, the new comment object information is displayed in the comment area in a preset chronological order or in a preset comment popularity order. For example, whether the new comment object information is displayed in a preset chronological order or in a preset comment popularity order needs to be consistent with the order adopted when the end-user browser displays the comment area of the webpage in step S5.

In one embodiment of the present disclosure, when the user make a comment to generate comment object information, the comment number list and the comment-number-sorted list corresponding to the webpage may both change. Therefore, popular paragraphs in the webpage article displayed by the end-user browser may change, and thus it is necessary to update the popularity scroll bar of the webpage and the scroll operation event corresponding to the scroll control in the end-user browser in time.

Therefore, when receiving the webpage address and the comment object information sent by the end-user browser, the server further acquires the comment number list corresponding to the webpage address according to the webpage address, and increments, according to position information included in the comment object information, the number of comments corresponding to the position information in the comment number list by one, to obtain a new comment number list.

Alternatively, the server acquires source code of a webpage corresponding to and based on the webpage address, and increments, according to position information included in the comment object information, a comment number attribute value of a webpage article element corresponding to the position information in the source code by one. Then, the server generates a new comment number list according to the source code after the operation of incrementing by one. The server sends the new comment number list to the end-user browser. The end-user browser regenerates a popularity scroll bar of the webpage article according to the new comment number list.

In addition, the server further re-sorts the new comment number list in a preset order according to the new comment number list, to generate a new comment-number-sorted, and sends the new comment-number-sorted list to the end-user browser. The end-user browser resets a scroll operation event corresponding to the scroll control on the popularity scroll bar according to the new comment-number-sorted.

In one embodiment of the present disclosure, the server may not generate the new comment-number-sorted list in the above manner. After the end-user browser receives the new comment number list, the end-user browser further generates a new comment-number-sorted list in a preset order according to the new comment number list, and resets a scroll operation event corresponding to the scroll control on the popularity scroll bar according to the generated new comment-number-sorted.

After the scroll operation event corresponding to the scroll control is reset, the end-user browser monitors the scroll control on the popularity scroll bar in real time, and when monitoring the scroll operation event triggered by the scroll control, performs a scroll operation corresponding to the reset scroll operation event.

In one embodiment of the present disclosure, in order to enable the user to conveniently read a webpage article element corresponding to comment object information when browsing the comment object information in a comment area and better understand the comment object information in combination with the webpage article element, the embodiments of the present disclosure further provide a solution of facilitating switching between the comment object information of the comment area and the webpage article element corresponding to the comment object information, which includes:

monitoring, by the end-user browser, a comment title of each piece of comment object information displayed in the comment area, and when monitoring that the comment title of a piece of comment object information triggers a redirect event, redirecting to display the webpage article element corresponding to the position information included in the comment object information; and returning to display the comment object information in the comment area when a return event triggered by a return key is determined.

In one embodiment of the present disclosure, the comment object information list includes multiple pieces of comment object information, the comment object information including position information of webpage article elements commented on by users; and the webpage comments corresponding to a webpage address are rendered and displayed according to the comment object information list. The webpage comments displayed in this manner can reflect which part of content is commented on by the users, such that the webpage comments can be understood in combination with the webpage article elements, thereby improving reference value and readability of the webpage comments.

Figure 2:
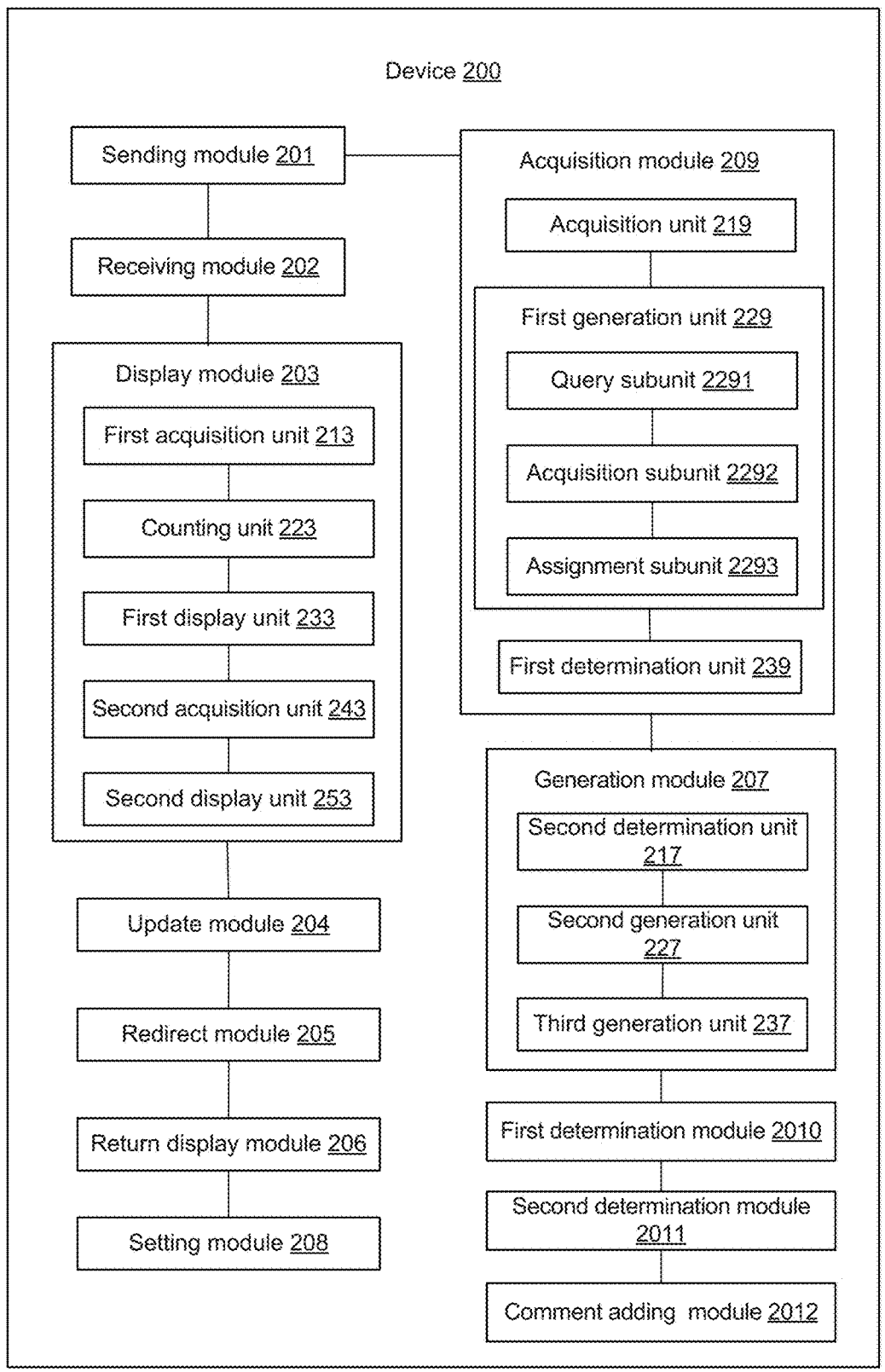
FIG. 2 is a block diagram illustrating a system for displaying webpage comments, consistent with exemplary embodiments of the present disclosure.

Referring to FIG. 2, the embodiments of the present disclosure provide a device 200 for webpage commenting, and the device is configured to perform the method disclosed above. The device 200 includes:

a sending module 201, configured to send a webpage browse request to a server, the webpage browse request including a webpage address;

a receiving module 202, configured to receive webpage information corresponding to the webpage address returned by the server, the webpage information including source code and a comment object information list, and each piece of comment object information in the comment object information list including position information of a webpage article element commented on by a user; and a display module 203, configured to render and display a webpage article corresponding to the webpage address according to the source code included in the webpage information, and display webpage comments corresponding to the webpage address according to the comment object information list.

The display module 203 may display the webpage comments of the webpage in a preset comment popularity order, and the display module 203 includes:

a first acquisition unit 213, configured to acquire, from each piece of comment object information in the comment object information list, the position information included in each piece of comment object information respectively; a counting unit 223, configured to count the number of comments corresponding to each piece of position information according to the position information included in each piece of comment object information; and a first display unit 233, configured to display, in a comment area of a webpage corresponding to the webpage address, multiple pieces of comment object information in the preset comment popularity order according to the number of comments corresponding to each piece of position information, the multiple pieces of comment object information being included in the comment object information list.

In one embodiment of the present disclosure, each piece of comment object information in the comment object information list further includes comment time; and the comment area of the webpage can also be displayed in a preset chronological order, and the display module 203 includes:

a second acquisition unit 243, configured to acquire, from each piece of comment object information in the comment object information list, the comment time included in each piece of comment object information respectively; and a second display unit 253, configured to display, in the comment area of the webpage, multiple pieces of comment object information in the preset chronological order according to the comment time included in each piece of comment object information, the multiple pieces of comment object information being included in the comment object information list.

In one embodiment of the present disclosure, when other users comment on the webpage to generate comment object information, it is necessary to update, via an update module 204 of device 200 as described below, the webpage comments of the webpage displayed by the end-user browser.

The update module 204 is configured to receive update information sent by the server, the update information including a new comment object information list or new comment object information of the webpage; if the update information includes the new comment object information list, update all the comment object information displayed in the comment area according to the new comment object information list; or if the update information includes the new comment object information, display the new comment object information in the comment area in the preset chronological order or in the preset comment popularity order.

In one embodiment of the present disclosure, in order to enable the user to conveniently read a webpage article element corresponding to comment object information when browsing the comment object information in the comment area and better understand the comment object information in combination with the webpage article element, the embodiments of the present disclosure further provide convenient switching between the comment object information of the comment area and the webpage article element corresponding to the comment object information via a redirect module 205 and a return display module 206 of device 200.

The redirect module 205 is configured to monitor a comment title of each piece of comment object information displayed in the comment area, and when determining that the comment title of a piece of comment object information triggers a redirect event, redirect to display the webpage article element corresponding to the position information included in the comment object information; and the return display module 206 is configured to return to display the comment object information in the comment area when a return event triggered by a return key is determined.

In one embodiment of the present disclosure, the webpage information further includes a comment number list that includes position information of webpage article elements in the webpage article and the number of comments; and the device 200 further includes:

a generation module 207, configured to generate, from a start position of the webpage article, a hotspot distribution bar corresponding to the webpage article on the basis of a preset coloring strategy and according to the position information of the webpage article elements and the number of comments included in the comment number list; and embed the hotspot distribution bar into a scroll bar of the webpage article, to obtain a popularity scroll bar corresponding to the webpage article.

In one embodiment of the present disclosure, the device further includes:

a setting module 208, configured to receive a comment-number-sorted list generated and sent by the server in a preset order, or generate the comment-number-sorted list in the preset order according to the comment number list; and set a scroll operation event corresponding to a scroll control on the popularity scroll bar according to the comment-number-sorted.

In one embodiment of the present disclosure, the comment object information list includes multiple pieces of comment object information, the comment object information including position information of webpage article elements commented on by users; and webpage comments corresponding to a webpage address are rendered and displayed according to the comment object information list. The webpage comments displayed in this manner can reflect which part of content is commented on by the users, such that the webpage comments can be understood in combination with the webpage article elements, thereby improving the reference value and readability of the webpage comments.

Figure 3:
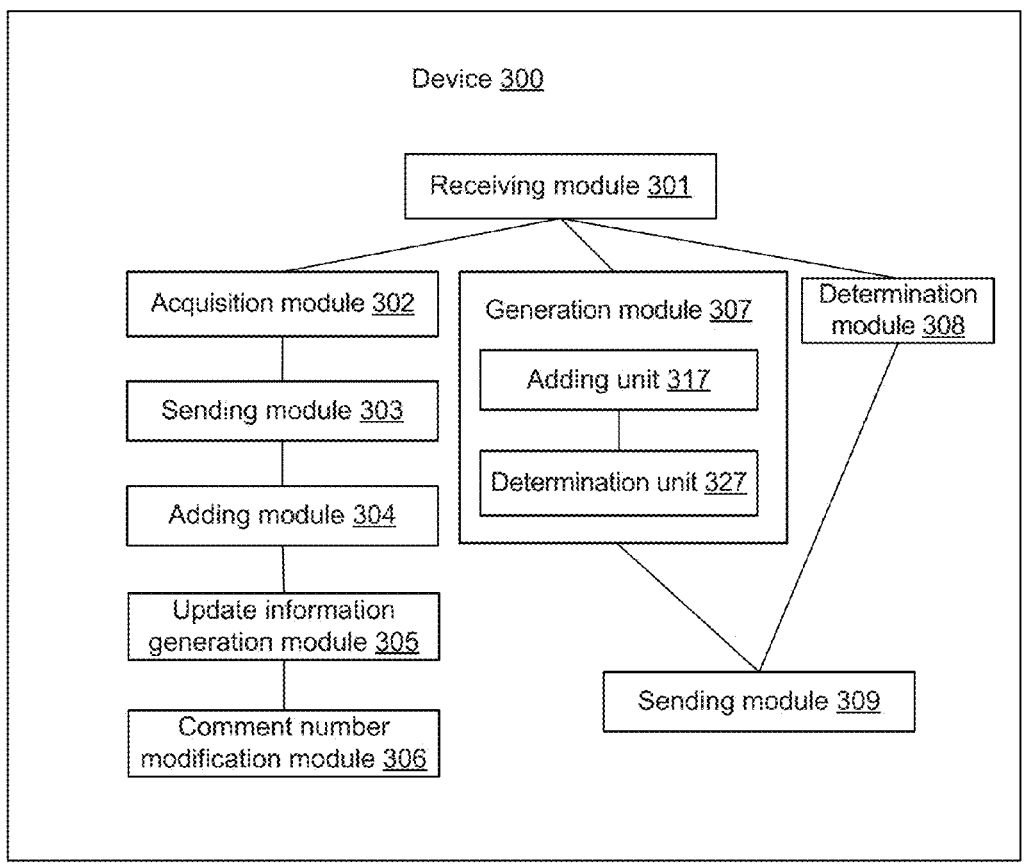
FIG. 3 is a block diagram illustrating a system for displaying webpage comments, consistent with exemplary embodiments of the present disclosure.

Referring to FIG. 3, the embodiments of the present disclosure provide a device 300 for webpage commenting, and the device is used for performing the method for webpage commenting disclosed above. The device 300 may be the server described above with reference to FIG. 2. The device 300 includes:

a receiving module 301, configured to receive a webpage browse request sent by an end-user browser, the webpage browse request including a webpage address;

an acquisition module 302, configured to acquire webpage information corresponding to the webpage address according to the webpage address, the webpage information including source code and a comment object information list, and each piece of comment object information in the comment object information list including position information of a webpage article element commented on by a user; and a sending module 303, configured to send the webpage information to the end-user browser, causing the end-user browser to display webpage comments corresponding to the webpage address according to the comment object information list.

In one embodiment of the present disclosure, the device 300 further adds the comment number list to the webpage information corresponding to the webpage address via an adding module 304 as follows:

The adding module 304 is configured to acquire a comment number list corresponding to the webpage address according to the webpage address, and add the comment number list to the webpage information.

The sending module 303 is further configured to generate the comment-number-sorted list corresponding to the webpage address in a preset order according to the comment number list, and send the comment-number-sorted list to the end-user browser.

In one embodiment of the present disclosure, when a user comments on a webpage article element in the webpage to generate new comment object information, the device 300 further generates update information via an update information generation module 305 as follows.

The update information generation module 305 is configured to receive the webpage address and the comment object information sent by the end-user browser; generate update information corresponding to the webpage address according to the comment object information; determine, according to the webpage address, an end-user browser that is accessing the webpage address currently; and send the update information to the determined end-user browser, causing the determined end-user browser to update and display the webpage comments corresponding to the webpage address according to the update information.

When new comment object information is generated, the device 300 further modifies the number of comments corresponding to the webpage article element via a comment number modification module 306, and generates a new comment number list.

The comment number modification module 306 is configured to acquire a comment number list corresponding to the webpage address according to the webpage address, and increment, according to position information included in the comment object information, the number of comments corresponding to the position information in the comment number list by one, to obtain a new comment number list; or acquire source code of a webpage corresponding to the webpage address according to the webpage address, increment, according to the position information included in the comment object information, a comment number attribute value of a webpage article element corresponding to the position information in the source code by one, and generate a new comment number list according to the source code after the operation of incrementing by one.

In one embodiment of the present disclosure, webpage information corresponding to a webpage address is acquired according to the webpage address, the webpage information including source code and a comment object information list, and each piece of comment object information in the comment object information list including position information of a webpage article element commented on by a user; and the webpage information is sent to an end-user browser, to cause the end-user browser to display webpage comments corresponding to the webpage address according to the comment object information list. In the present disclosure, a comment object information list is sent to an end-user browser, comment object information included in the comment object information list including position information of webpage article elements commented on by users, and the end-user browser displays webpage comments according to the comment object information list. The part of content commented on by users can be reflected, such that the webpage comments can be understood in combination with the webpage article elements, thereby improving the reference value and readability of the webpage comments.

Figure 4:
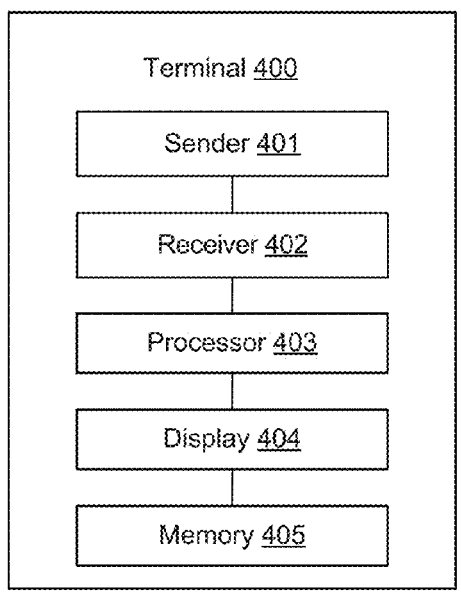
FIG. 4 is a block diagram illustrating a system for displaying webpage comments, consistent with exemplary embodiments of the present disclosure.

Referring to FIG. 4, the embodiment of the present disclosure provides a terminal 400, configured to perform the method of displaying webpage comments disclosed above. Terminal 400 may correspond to device 200, and the terminal 400 includes:

a sender 401, configured to send a webpage browse request to a server, the webpage browse request including a webpage address;

a receiver 402, configured to receive webpage information corresponding to the webpage address returned by the server, the webpage information including source code and a comment object information list, and each piece of comment object information in the comment object information list including position information of a webpage article element commented on by a user;

a processor 403, configured to render a webpage article corresponding to the webpage address according to the source code included in the webpage information, and render webpage comments corresponding to the webpage address according to the comment object information list;

a display 404, configured to display the webpage article and the webpage comments corresponding to the webpage address; and a non-transitory computer-readable memory 405 storing instructions that, when executed by the processor 403, cause the terminal 400 to perform one or more methods disclosed herein.

In one embodiment of the present disclosure, the webpage comments corresponding to the webpage address can be rendered and displayed in a preset popularity order.

The processor 403 is configured to acquire, from each piece of comment object information in the comment object information list, the position information included in each piece of comment object information respectively; and count the number of comments corresponding to each piece of position information according to the position information included in each piece of comment object information; and the display 404 is configured to display, in a comment area of a webpage corresponding to the webpage address, multiple pieces of comment object information in the preset comment popularity order according to the number of comments corresponding to each piece of position information, the multiple pieces of comment object information being included in the comment object information list.

In one embodiment of the present disclosure, each piece of comment object information in the comment object information list further includes comment time; and the webpage comments corresponding to the webpage address can also be rendered and displayed in a preset chronological order.

The processor 403 is configured to acquire, from each piece of comment object information in the comment object information list, the comment time included in each piece of comment object information respectively; and the display 404 is configured to display, in a comment area of a webpage, multiple pieces of comment object information in the preset chronological order according to the comment time included in each piece of comment object information, the multiple pieces of comment object information being included in the comment object information list.

The receiver 402 is further configured to receive update information sent by the server, the update information including a new comment object information list or new comment object information of the webpage; and the display 404 is further configured to, if the update information includes the new comment object information list, update all the comment object information displayed in the comment area according to the new comment object information list; or if the update information includes the new comment object information, display the new comment object information in the comment area in the preset chronological order or the preset comment popularity order.

The processor 403 is further configured to monitor a comment title of each piece of comment object information displayed in the comment area, and when determining that the comment title of a piece of comment object information triggers a redirect event, redirect to display the webpage article element corresponding to the position information included in the comment object information; and return to display the comment object information in the comment area when a return event triggered by a return key is determined.

In one embodiment of the present disclosure, the webpage information further includes a comment number list that includes position information of webpage article elements in the webpage article and the number of comments; and the processor 403 is configured to generate, from a start position of the webpage article, a hotspot distribution bar corresponding to the webpage article on the basis of a preset coloring strategy and according to the position information of the webpage article elements and the number of comments included in the comment number list; and embed the hotspot distribution bar into a scroll bar of the webpage article, to obtain a popularity scroll bar corresponding to the webpage article.

In one embodiment of the present disclosure, the receiver 402 is further configured to receive a comment-number-sorted list generated and sent by the server in a preset order; or the processor 403 is further configured to generate the comment-number-sorted list in the preset order according to the comment number list; and set a scroll operation event corresponding to a scroll control on the popularity scroll bar according to the comment-number-sorted.

In one embodiment of the present disclosure, each comment object information in a comment object information list includes position information of a webpage article element commented on by a user; and webpage comments corresponding to a webpage address are rendered and displayed according to the comment object information list. The webpage comments displayed can reflect which part of content is commented on by users, such that the webpage comments can be understood in combination with the webpage article elements, thereby improving the reference value and readability of the webpage comments.

Figure 5:
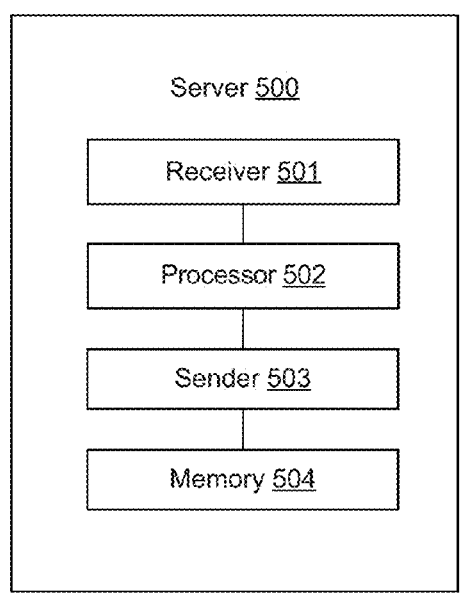
FIG. 5 is a block diagram illustrating a system for displaying webpage comments, consistent with exemplary embodiments of the present disclosure.

Referring to FIG. 5, the embodiments of the present disclosure provide a server 500 configured to perform the method of displaying webpage comments disclosed above. The server 500 may correspond to the device 300, and the server 500 includes:

a receiver 501, configured to receive a webpage browse request sent by an end-user browser, the webpage browse request including a webpage address;

a processor 502, configured to acquire webpage information corresponding to the webpage address according to the webpage address, the webpage information including source code and a comment object information list, and each piece of comment object information in the comment object information list including position information of a webpage article element commented on by a user;

a sender 503, configured to send the webpage information to the end-user browser, to cause the end-user browser to display webpage comments corresponding to the webpage address according to the comment object information list; and a non-transitory computer-readable memory 504 storing instructions that, when executed by the processor 502, cause the server 500 to perform one or more methods disclosed herein.

The processor 502 is further configured to acquire a comment number list corresponding to the webpage address according to the webpage address, and add the comment number list to the webpage information; and generate a comment-number-sorted list corresponding to the webpage address in a preset order according to the comment number list; and the sender 503 is further configured to send the comment-number-sorted list to the end-user browser.

The receiver 501 is further configured to receive the webpage address and the comment object information sent by the end-user browser;

the processor 502 is further configured to generate update information corresponding to the webpage address according to the comment object information; and determine, according to the webpage address, an end-user browser that is accessing the webpage address currently; and the sender 503 is further configured to send the update information to the determined end-user browser, causing the determined end-user browser to update and display the webpage comments corresponding to the webpage address according to the update information.

The processor 502 is further configured to acquire a comment number list corresponding to the webpage address according to the webpage address, and increment, according to position information included in the comment object information, the number of comments corresponding to the position information in the comment number list by one, to obtain a new comment number list; or acquire source code of a webpage corresponding to the webpage address according to the webpage address, increment, according to position information included in the comment object information, a comment number attribute value of a webpage article element corresponding to the position information in the source code by one, and generate a new comment number list according to the source code after the operation of incrementing by one.

In one embodiment of the present disclosure, webpage information corresponding to a webpage address is acquired according to the webpage address, the webpage information including source code and a comment object information list, and each piece of comment object information in the comment object information list including position information of a webpage article element commented on by a user; and the webpage information is sent to an end-user browser, causing the end-user browser to display webpage comments corresponding to the webpage address according to the comment object information list. In the present disclosure, a comment object information list is sent to an end-user browser, comment object information included in the comment object information list including position information of webpage article elements commented on by users, and the end-user browser displays webpage comments according to the comment object information list. The part of content commented on by users can be reflected, such that the webpage comments can be understood in combination with the webpage article elements, thereby improving the reference value and readability of the webpage comments.

The embodiments of the present disclosure further provides a method for webpage commenting.

Before a comment is made on a webpage article in a webpage, an end-user browser displays the webpage in a manner as follows. The end-user browser sends a browse request to a server, the browse request including a webpage address. The server receives the browse request sent by the end-user browser, and acquires webpage information corresponding to the webpage address according to the webpage address included in the browse request. The webpage information includes source code of the webpage and a comment object information list. The comment object information list includes multiple pieces of comment object information existing in the webpage, that is, comment object information generated by all users making comments on the webpage article of the webpage prior to current time. The comment object information includes position information of webpage article elements commented on by the users, comment information of the users' comments, user IDs, comment titles, and comment time. The comment information of the users' comments may be comment texts, pictures, emoji images or the like input by the users. The server sends the webpage information to the end-user browser. The end-user browser receives the webpage information, returned by the server, corresponding to the webpage address, and renders and displays the webpage corresponding to the webpage address according to the webpage information.

The end-user browser renders and displays the webpage article of the webpage according to the source code included in the webpage information, and renders and displays the comment area of the webpage according to the comment object information included in the webpage information.

Figure 6:
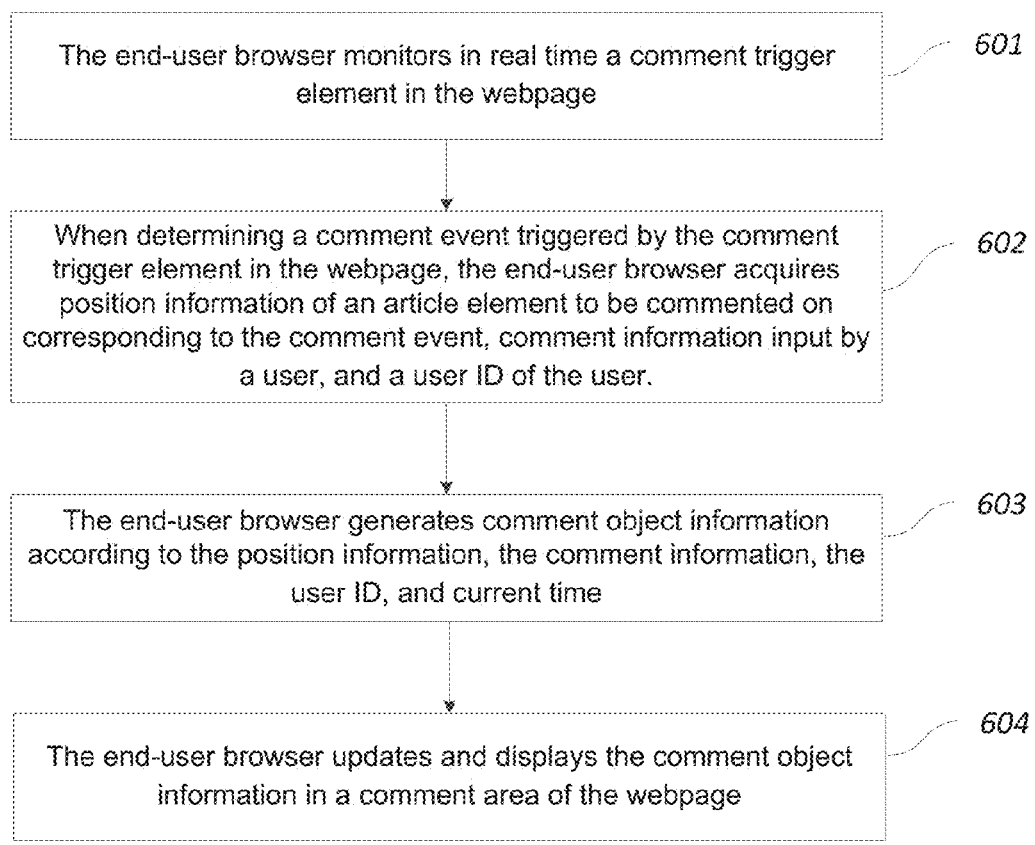
FIG. 6 is a flow diagram illustrating a method for displaying webpage comments, consistent with exemplary embodiments of the present disclosure.

Referring to FIG. 6, after the end-user browser displays the webpage article and the comment area in the webpage in the above manner, webpage comments are made via the operations of steps 601-604 as follows.

Step 601: The end-user browser monitors in real time a comment trigger element in the webpage.

The comment trigger element may be a comment tracking button in the webpage or a webpage article element such as a paragraph and a picture in the webpage article. The comment tracking button may be at a preset position in the webpage, for example, the comment tracking button is at the upper side, the lower side, the left side, the right side, or the like of the webpage article in the webpage. The comment tracking button may have a fixed position, and not move out of a screen display area with scrolling of the webpage article. A user may single-click the comment tracking button to trigger a comment operation, or the user may long-press a paragraph in the webpage article to trigger a comment on the paragraph, or long-press a picture in the webpage article to trigger a comment on the image.

When the comment trigger element is the comment tracking button, the end-user browser monitors in real time the comment tracking button in the webpage, and when monitoring a single click event of the comment tracking button, determines that the comment tracking button triggers a comment event.

When the comment trigger element is all webpage article elements currently displayed in the screen display area, the end-user browser monitors in real time all the webpage article elements, and when determining a long press event of a webpage article element in all the webpage article elements, determines that the webpage article element triggers a comment event.

Step 602: When determining a comment event triggered by the comment trigger element in the webpage, the end-user browser acquires position information of an article element to be commented on corresponding to the comment event, comment information input by a user, and a user ID of the user.

When monitoring the single click event of the comment tracking button, the end-user browser determines that the comment tracking button triggers a comment event, and the end-user browser acquires, from the screen display area, a currently displayed webpage article paragraph as the article element to be commented on corresponding to the comment event.

At this point, the currently displayed webpage article paragraph is all paragraphs currently displayed in the screen display area, and thus the article element to be commented on acquired at this point may be one or more paragraphs.

When monitoring a long press event of a webpage article element in all the webpage article elements currently displayed in the screen display area, the end-user browser determines the webpage article element, from which the long press event is monitored, as the article element to be commented on corresponding to the comment event. If a long press event of a picture is detected, the picture is determined as the article element to be commented on.

After the article element to be commented on is determined as described above, the end-user browser generates, according to the source code of the webpage and the article element to be commented on, the position information of the article element to be commented on, which includes:

querying whether the source code of the webpage includes a Hyper Text Markup Language (HTML) object ID of the article element to be commented on; if yes, acquiring, from the source code, the HTML object ID of the article element to be commented on as the position information of the article element to be commented on; or if no, assigning a unique ID to the article element to be commented on, and determining the assigned unique ID as the position information of the article element to be commented on.

The HTML object ID is a unique ID of the webpage article element in the webpage article, and can uniquely determine the position of the webpage article element in the webpage article.

When monitoring the comment event triggered by the comment trigger element, the end-user browser displays a comment determination interface to the user, the comment determination interface including prompt information for prompting users whether they decide to make comments, a comment button and a cancel button. The prompt information for prompting users whether they decide to make comments may be, for example, "are you sure to make a comment?" or "I want to comment on it" and the like. When the user single-clicks the comment button, the end-user browser displays a comment information input box to the user. The user can edit, in the comment information input box, a comment text or input a picture or an emoji image that can express feelings. The end-user browser acquires, from the comment information input box, the comment text, the picture or emoji image, and the like input by the user as the comment information input by the user.

Step 603: The end-user browser generates comment object information according to the position information, the comment information, the user ID, and current time.

The end-user browser determines the current time as comment time corresponding to the article element to be commented on; generates, via a preset title strategy according to the position information, the comment information, the user ID, and the comment time, a comment title corresponding to the article element to be commented on; and generates the comment object information according to the position information, the comment information, the user ID, the comment title, and the comment time. In one embodiment of the present disclosure, the position information, the comment information, the user ID, the comment title, and the comment time can form the comment object information.

The preset title strategy may be: generating a comment title according to the position information and the user ID, or generating a comment title according to the position information and the comment information, or the like. The preset title strategy may be a strategy customized by the user, and may also be a strategy delivered by the server to the end-user browser.

Step 604: The end-user browser updates and displays the comment object information in a comment area of the webpage.

The end-user browser may first display the generated comment object information in a comment area of the webpage currently displayed locally, and at the same time, send the comment object information to the server. After receiving the comment object information, the server determines other end-user browsers that are displaying the webpage, and the server sends the comment object information to the determined other end-user browsers, causing the other end-user browsers to update and display the comment object information in the comment area of the webpage.

In this way, when the user's comment generates comment object information, the comment object information is immediately displayed in the comment area of the webpage locally. The local display has no time delay, which improves the user experience. In addition, the end-user browser and other end-user browsers update and display the comment object information in a preset chronological order or in a preset comment popularity order.

As comment object information generated when users make comments sometimes may include content violating related law regulations, it is necessary to examine the comment object information before updating and displaying the comment object information. Therefore, in one embodiment of the present disclosure, the end-user browser may not immediately display the generated comment object information in the comment area of the webpage locally, but first send the comment object information to the server. The server receives the comment object information, and after the comment object information is examined and approved by an examiner or after the server automatically carries out a semantic analysis, and examines and approves the comment object information, the server determines all end-user browsers that are displaying the webpage currently and sends the comment object information to each of the determined end-user browsers. Each end-user browser that is currently displaying the webpage receives the comment object information sent by the server and displays the comment object information in the comment area of the webpage that the end-user browser is displaying currently.

In one embodiment of the present disclosure, when the user makes a comment to generate comment object information, and the comment object information is displayed and updated to other users through the server, referring back to FIG. 1D, the comment object information is updated and displayed via the operations of steps A1-A4 as follows.

A1: The server receives a webpage address and comment object information sent by an end-user browser, and generates update information corresponding to the webpage address according to the comment object information.

The server adds the comment object information to a comment object information list corresponding to the webpage address to obtain a new comment object information list, and uses the new comment object information list as the update information corresponding to the webpage address; or the server directly determines the received comment object information as the update information corresponding to the webpage address.

A2: The server determines, according to the webpage address, an end-user browser that is accessing the webpage address currently.

When the end-user browser requests to access a webpage address, the end-user browser further sends its own ID to the server, and the server records a corresponding relationship between the webpage address and the ID of the end-user browser.

The server acquires the ID of the corresponding end-user browser from the corresponding relationship between the webpage address and the ID of the end-user browser according to the webpage address, and determines the end-user browser corresponding to the acquired ID as the end-user browser that is accessing the webpage address currently.

A3: The server sends the generated update information to the determined end-user browser.

A4: The end-user browser receives the update information sent by the server, and updates, according to the update information, the comment area of the webpage currently displayed.

The end-user browser receives the update information sent by the server, the update information including a new comment object information list or new comment object information of the webpage. If the update information includes the new comment object information list, all the comment object information displayed in the comment area is updated according to the new comment object information list; and if the update information includes only the new comment object information, the new comment object information is displayed in the comment area in a preset chronological order or in a preset comment popularity order.

As a user may have thoughts on a piece of comment object information when browsing the comment object information in the comment area and need to make a comment on the comment object information, a comment adding solution is provided in one embodiment of the present disclosure, which includes:

monitoring in real time a comment adding trigger element corresponding to each piece of comment object information in the comment area of the webpage; acquiring, when an adding event triggered by a comment adding trigger element corresponding to a piece of comment object information is determined, position information included in the comment object information triggering the adding event, comment information added by a user, and a user ID of the user, and generating added comment object information; and updating and displaying the added comment object information in the comment area of the webpage.

The operation of updating and displaying the added comment object information is the same as the operation of updating and displaying in step 604, which is not repeated herein.

The comment adding trigger element may be comment information included in the comment object information, and by long-pressing the comment information of the comment object information, the user may trigger an adding event of the comment object information. The comment adding trigger element may also be a comment adding trigger button, each piece of comment object information in the comment area may be provided with a corresponding comment adding trigger button, and the user may single-click the comment adding trigger button at a piece of comment object information to trigger an adding event.

Since the article element to be commented on and corresponding to the added comment object information is the same as the webpage article element corresponding to the comment object information which corresponds to the adding event, position information included in the comment object information corresponding to the adding event is directly used as the position information corresponding to the added comment object information.

In one embodiment of the present disclosure, when a comment event triggered by a comment trigger element in a webpage is detected, position information of an article element to be commented on corresponding to the comment event, comment information input by a user, and a user ID of the user are acquired; comment object information is generated according to the position information, the comment information, the user ID, and current time; and the comment object information is updated and displayed in a comment area of the webpage. In the present disclosure, comment object information is generated according to position information of an article element to be commented on, and the part of content commented on by a user can be reflected by the comment object information, such that the comment object information of the user's comment can be understood in combination with the article element to be commented on, thereby improving the reference value and readability of the comment object information.

Referring back to FIG. 2, the device 200 may perform the method for webpage commenting disclosed above. The device 200 further includes:

an acquisition module 209, configured to acquire, when a comment event triggered by a comment trigger element in a webpage is determined, position information of an article element to be commented on corresponding to the comment event, comment information input by a user, and a user ID of the user;

the generation module 207, further configured to generate comment object information according to the position information, the comment information, and the user ID acquired by the acquisition module 209 as well as current time; and the update module 204, further configured to update and display the comment object information in a comment area of the webpage.

The comment trigger element includes a comment tracking button; at this point, the device 200 determines, via a first determination module 2010, whether a comment event is triggered.

The first determination module 2010 is configured to monitor in real time the comment tracking button in the webpage, and determine, when a single click event of the comment tracking button is determined, that the comment tracking button triggers a comment event.

Alternatively, the comment trigger element includes all webpage article elements currently displayed in a screen display area, and at this point, the device 200 determines, via a second determination module 2011, whether a comment event is triggered.

The second determination module 2011 is configured to monitor in real time all the webpage article elements, and determine, when a long press event of a webpage article element in all the webpage article elements is detected, that the webpage article element triggers a comment event.

When the single click event of the comment tracking button is detected, the acquisition module 209 acquires, via an acquisition unit 219 and a first generation unit 229, the position information of the article element to be commented on.

The acquisition unit 219 is configured to acquire, from the screen display area, a currently displayed webpage article paragraph as the article element to be commented on corresponding to the comment event; and the first generation unit 229 is configured to generate, according to source code of the webpage and the article element to be commented on, the position information of the article element to be commented on.

When the long press event of the webpage article element in all the webpage article elements is detected, the acquisition module 209 acquires, via a first determination unit 239 and the first generation unit 229, the position information of the article element to be commented on.

The first determination unit 239 is configured to determine the webpage article element, of which the long press event is detected, as the article element to be commented on corresponding to the comment event; and the first generation unit 229 is configured to generate, according to source code of the webpage and the article element to be commented on, the position information of the article element to be commented on.

The first generation unit 229 generates, via a query subunit 2291, an acquisition subunit 2292 and an assignment subunit 2293, the position information of the article element to be commented on.

The query subunit 2291 is configured to query whether the source code of the webpage includes a Hyper Text Markup Language (HTML) object ID of the article element to be commented on; the acquisition subunit 2292 is configured to acquire, when the query subunit 2291 determines that the source code of the webpage includes the HTML object ID of the article element to be commented on, the HTML object ID of the article element to be commented on from the source code as the position information of the article element to be commented on; and the assignment subunit 2293 is configured to assign, when the query subunit 2291 finds that the source code of the webpage does not include the HTML object ID of the article element to be commented on, a unique ID to the article element to be commented on, and determine the assigned unique ID as the position information of the article element to be commented on.

In one embodiment of the present disclosure, the generation module 207 generates the comment object information via a second determination unit 217, a second generation unit 227, and a third generation unit 237.

The second determination unit 217 is configured to determine the current time as comment time corresponding to the article element to be commented on; the second generation unit 227 is configured to generate, via a preset title strategy according to the position information, the comment information, the user ID, and the comment time, a comment title corresponding to the article element to be commented on; and the third generation unit 237 is configured to generate the comment object information according to the position information, the comment information, the user ID, the comment title, and the comment time.

As a user may have new thoughts on a piece of comment object information when browsing the comment object information in the comment area and need to comment on the comment object information, the embodiments of the present disclosure further provides adding comments via a comment adding module 2012.

The comment adding module 2012 is configured to monitor in real time a comment adding trigger element corresponding to each piece of comment object information in the comment area of the webpage; acquire, when an adding event triggered by a comment adding trigger element corresponding to a piece of comment object information is detected, position information included in the comment object information triggering the adding event, comment information added by a user, and a user ID of the user, and generate added comment object information; and display the added comment object information after the comment object information that triggers the adding event, and send the webpage address of the webpage and the added comment object information to a server.

In one embodiment of the present disclosure, the update module 204 is configured to send a webpage address of the webpage and the comment object information to a server, to cause the server to update the comment object information for all end-user browsers that are displaying the webpage currently.

In one embodiment of the present disclosure, when a comment event triggered by a comment trigger element in a webpage is detected, position information of an article element to be commented on corresponding to the comment event, comment information input by a user, and a user ID of the user are acquired; comment object information is generated according to the position information, the comment information, the user ID, and current time; and the comment object information is updated and displayed in a comment area of the webpage. In the present disclosure, comment object information is generated according to position information of an article element to be commented on, and the part of content is commented on by a user can be reflected by the comment object information, such that the comment object information of the user's comment can be understood in combination with the article element to be commented on, thereby improving the reference value and readability of the comment object information.

Referring back to FIG. 3, the device 300 may perform the method for webpage commenting disclosed above.

The receiving module 301 of device 300 may be further configured to receive a webpage address and comment object information sent by an end-user browser, the comment object information including position information of an article element to be commented on.

The device 300 further includes:

a generation module 307, configured to generate update information corresponding to the webpage address according to the comment object information received by the receiving module 301;

a determination module 308, configured to determine, according to the webpage address received by the receiving module 301, an end-user browser that is accessing the webpage address currently; and a sending module 309, configured to send the update information generated by the generation module 307 to the end-user browser determined by the determination module 308, to cause the determined end-user browser to update a comment area of a webpage corresponding to the webpage address according to the update information.

The generation module 307 generates the update information corresponding to the webpage address via an adding unit 317 or a determination unit 327.

The adding unit 317 is configured to add the comment object information to a comment object information list corresponding to the webpage address to obtain a new comment object information list, and use the new comment object information list as the update information corresponding to the webpage address; or the determination unit 327 is configured to directly determine the received comment object information as the update information corresponding to the webpage address.

In one embodiment of the present disclosure, a webpage address and comment object information sent by an end-user browser are received, the comment object information including position information of an article element to be commented on; update information corresponding to the webpage address is generated according to the comment object information; an end-user browser that is accessing the webpage address currently is determined according to the webpage address; and the update information is sent to the determined end-user browser, causing the determined end-user browser to update a comment area of a webpage corresponding to the webpage address according to the update information. In the present disclosure, as comment object information includes position information of an article element to be commented on, after an end-user browser updates a comment area of a webpage according to the comment object information, the part of content commented on by the user can be reflected by the comment object information in the comment area, such that the comment object information of the user's comment can be understood in combination with the article element to be commented on, thereby improving the reference value and readability of the comment object information.

Referring back to FIG. 4, the terminal 400 may, perform the method for webpage commenting disclosed above. The terminal 400 may correspond to the device 200.

The processor 403 is further configured to acquire, when a comment event triggered by a comment trigger element in a webpage displayed by the display 404 is detected, position information of an article element to be commented on corresponding to the comment event, comment information input by a user, and a user ID of the user; generate comment object information according to the position information, the comment information, the user ID, and current time; and update and display the comment object information in a comment area of the webpage.

The comment trigger element includes a comment tracking button; and the processor 403 is further configured to monitor in real time the comment tracking button in the webpage displayed by the display 404, and determine, when a single click event of the comment tracking button is detected, that the comment tracking button triggers a comment event.

Alternatively, the comment trigger element includes all webpage article elements currently displayed in a screen display area, and the processor 403 is further configured to monitor in real time all the webpage article elements, and determine, when a long press event of a webpage article element in all the webpage article elements is detected, that the webpage article element triggers a comment event.

When the processor 403 monitors the single click event of the comment tracking button, the processor 403 is configured to acquire, from the screen display area of the display 404, a currently displayed webpage article paragraph as the article element to be commented on corresponding to the comment event; and generate, according to source code of the webpage and the article element to be commented on, the position information of the article element to be commented on.

When the processor 403 detects the long press event of any webpage article element in all the webpage article elements, the processor 403 is configured to determine the webpage article element, of which the long press event is detected, as the article element to be commented on corresponding to the comment event; and generate, according to source code of the webpage and the article element to be commented on, the position information of the article element to be commented on.

The processor 403 is configured to query whether the source code of the webpage includes a Hyper Text Markup Language (HTML) object ID of the article element to be commented on; if yes, acquire, from the source code, the HTML object ID of the article element to be commented on as the position information of the article element to be commented on; or if no, assign a unique ID to the article element to be commented on, and determine the assigned unique ID as the position information of the article element to be commented on.

The processor 403 is configured to determine the current time as comment time corresponding to the article element to be commented on; generate, via a preset title strategy according to the position information, the comment information, the user ID, and the comment time, a comment title corresponding to the article element to be commented on; and generate the comment object information according to the position information, the comment information, the user ID, the comment title, and the comment time.

The processor 403 is further configured to monitor in real time a comment adding trigger element corresponding to each piece of comment object information in the comment area of the webpage displayed by the display 404; when an adding event triggered by a comment adding trigger element corresponding to the comment object information is detected, acquire position information included in the comment object information triggering the adding event, comment information added by a user, and a user ID of the user, and generate added comment object information; and update and display the added comment object information in the comment area of the webpage.

In one embodiment of the present disclosure, the terminal further includes a sender, and the sender is configured to send a webpage address of the webpage and the comment object information to a server, to cause the server to update the comment object information for all end-user browsers that are displaying the webpage currently.

In one embodiment of the present disclosure, when a comment event triggered by a comment trigger element in a webpage is detected, position information of an article element to be commented on corresponding to the comment event, comment information input by a user, and a user ID of the user are acquired; comment object information is generated according to the position information, the comment information, the user ID, and current time; and the comment object information is updated and displayed in a comment area of the webpage. In the present disclosure, comment object information is generated according to position information of an article element to be commented on, and the part of content commented on by a user can be embodied through the comment object information, such that the comment object information of the user's comment can be understood in combination with the article element to be commented on, thereby improving the reference value and readability of the comment object information.

Referring back to FIG. 5, for the server 500 may perform the method for webpage commenting disclosed above. The server 500 may correspond to the device 300.

The receiver 501 may be further configured to receive a webpage address and comment object information sent by an end-user browser, the comment object information including position information of an article element to be commented on;

The processor 502 may be further configured to generate update information corresponding to the webpage address according to the comment object information; and determine, according to the webpage address, an end-user browser that is accessing the webpage address currently; and The sender 503 may be further configured to send the update information to the determined end-user browser, causing the determined end-user browser to update a comment area of a webpage corresponding to the webpage address according to the update information.

The processor 502 is configured to add the comment object information to a comment object information list corresponding to the webpage address to obtain a new comment object information list, and use the new comment object information list as the update information corresponding to the webpage address; or directly determine the received comment object information as the update information corresponding to the webpage address.

In one embodiment of the present disclosure, a webpage address and comment object information sent by an end-user browser are received, the comment object information including position information of an article element to be commented on; update information corresponding to the webpage address is generated according to the comment object information; an end-user browser that is accessing the webpage address currently is determined according to the webpage address; and the update information is sent to the determined end-user browser, causing the determined end-user browser to update a comment area of a webpage corresponding to the webpage address according to the update information. In the present disclosure, as comment object information includes position information of an article element to be commented on, after the end-user browser updates a comment area of a webpage according to the comment object information, the part of content commented on by the user can be reflected by the comment object information in the comment area, such that the comment object information of the user's comment can be understood in combination with the article element to be commented on, thereby improving the reference value and readability of the comment object information.

The devices for webpage commenting provided in the embodiments of the present disclosure may be specific hardware on equipment, software or firmware installed on equipment, or the like. Persons skilled in the art can clearly understand that, to make the description convenient and concise, reference can be made to the corresponding processes in the previous method embodiments for the working processes of the modules, devices and units described above.

In the several embodiments provided in the present disclosure, it should be understood that the disclosed devices and methods may be implemented in other manners. The described device embodiments are only schematic. For example, division of the units is merely a logical function division, and there may be other division manners in actual implementation, for example, a plurality of units or components may be combined or integrated into another system, or some features may be ignored or not performed. In addition, the mutual coupling or direct coupling or communication connections displayed or discussed may be implemented through some communication interfaces, and the indirect coupling or communication connections between the devices or units may be implemented electrically, mechanically or in another form.

The units described as separate parts may or may not be physically separate, and parts displayed as units may or may not be physical units, that is, they may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit.

If the function is implemented in the form of a software functional unit and is sold or used as an independent product, it may be stored in a computer-readable storage medium. Based on such an understanding, the technical solution of the present disclosure essentially, or a part contributing to the prior art, or a part of the technical solution can be embodied in the form of a software product. The computer software product is stored in a storage medium and includes several instructions to cause a computer device (which may be a personal computer, a server, a network device or the like) to perform all or some steps of the method as described in the embodiments of the present disclosure. The storage medium includes various media that can store program code such as a USB disk, a mobile hard disk, a Read-Only Memory (ROM), a Random Access Memory (RAM), a magnetic disk or an optical disc.

The above descriptions are merely specific implementations of the present invention, but the protection scope of the present invention is not limited thereto; any variations or replacements that can be easily thought of by persons skilled in the art within the technical scope disclosed in the present invention should be included in the protection scope of the present invention. Therefore, the protection scope of the present invention should be subject to the protection scope of the claims.

A person skilled in the art can further understand that, various exemplary logic blocks, modules, circuits, and algorithm steps described with reference to the disclosure herein may be implemented as specialized electronic hardware, computer software, or a combination of electronic hardware and computer software. For examples, the modules/units may be implemented by one or more processors to cause the one or more processors to become one or more special purpose processors to executing software instructions stored in the computer-readable storage medium to perform the specialized functions of the modules/units.

The flowcharts and block diagrams in the accompanying drawings show system architectures, functions, and operations of possible implementations of the system and method according to multiple embodiments of the present invention. In this regard, each block in the flowchart or block diagram may represent one module, one program segment, or a part of code, where the module, the program segment, or the part of code includes one or more executable instructions used for implementing specified logic functions. It should also be noted that, in some alternative implementations, functions marked in the blocks may also occur in a sequence different from the sequence marked in the drawing. For example, two consecutive blocks actually can be executed in parallel substantially, and sometimes, they can also be executed in reverse order, which depends on the functions involved. Each block in the block diagram and/or flowchart, and a combination of blocks in the block diagram and/or flowchart, may be implemented by a dedicated hardware-based system for executing corresponding functions or operations, or may be implemented by a combination of dedicated hardware and computer instructions.

As will be understood by those skilled in the art, embodiments of the present disclosure may be embodied as a method, a system or a computer program product. Accordingly, embodiments of the present disclosure may take the form of an entirely hardware embodiment, an entirely software embodiment or an embodiment combining software and hardware for allowing specialized components to perform the functions described above. Furthermore, embodiments of the present disclosure may take the form of a computer program product embodied in one or more tangible and/or non-transitory computer-readable storage media/memory containing computer-readable program codes/instructions. Common forms of non-transitory computer readable storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same.

Embodiments of the present disclosure are described with reference to flow diagrams and/or block diagrams of methods, devices (systems), and computer program products according to embodiments of the present disclosure. It will be understood that each flow and/or block of the flow diagrams and/or block diagrams, and combinations of flows and/or blocks in the flow diagrams and/or block diagrams, can be implemented by computer program instructions. These computer program instructions may be provided to a processor of a computer, an embedded processor, or other programmable data processing devices to produce a special purpose machine, such that the instructions, which are executed via the processor of the computer or other programmable data processing devices, create a means for implementing the functions specified in one or more flows in the flow diagrams and/or one or more blocks in the block diagrams.

These computer program instructions may also be stored in a computer-readable memory that can direct a computer or other programmable data processing devices to function in a particular manner, such that the instructions stored in the computer-readable memory produce a manufactured product including an instruction means that implements the functions specified in one or more flows in the flow diagrams and/or one or more blocks in the block diagrams.

These computer program instructions may also be loaded onto a computer or other programmable data processing devices to cause a series of operational steps to be performed on the computer or other programmable devices to produce processing implemented by the computer, such that the instructions (which are executed on the computer or other programmable devices) provide steps for implementing the functions specified in one or more flows in the flow diagrams and/or one or more blocks in the block diagrams. In a typical configuration, a computer device includes one or more Central Processors (CPUs), an input/output interface, a network interface, and a memory. The memory may include forms of a volatile memory, a random access memory (RAM), and/or non-volatile memory and the like, such as a read-only memory (ROM) or a flash RAM in a computer-readable storage medium. The memory is an example of the computer-readable storage medium.

The computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The computer-readable medium includes non-volatile and volatile media, and removable and non-removable media, and information storage can be implemented with any method or technology. Information may be modules of computer-readable instructions, data structures and programs, or other data. Examples of a non-transitory computer-readable medium include but are not limited to a phase-change random access memory (PRAM), a static random access memory (SRAM), a dynamic random access memory (DRAM), other types of random access memories (RAMs), a read-only memory (ROM), an electrically erasable programmable read-only memory (EEPROM), a flash memory or other memory technologies, a compact disc read-only memory (CD-ROM), a digital versatile disc (DVD) or other optical storage, a cassette tape, tape or disk storage or other magnetic storage devices, a cache, a register, or any other non-transmission media that may be used to store information capable of being accessed by a computer device. The computer-readable storage medium is non-transitory, and does not include transitory media, such as modulated data signals and carrier waves.

The specification has described attention monitoring methods, apparatus, and systems for human-machine interaction. The illustrated steps are set out to explain the exemplary embodiments shown, and it should be anticipated that ongoing technological development will change the manner in which particular functions are performed. Thus, these examples are presented herein for purposes of illustration, and not limitation. For example, steps or processes disclosed herein are not limited to being performed in the order described, but may be performed in any order, and some steps may be omitted, consistent with the disclosed embodiments. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

It will be appreciated that the present invention is not limited to the exact construction that has been described above and illustrated in the accompanying drawings, and that various modifications and changes can be made without departing from the scope thereof. It is intended that the scope of the invention should only be limited by the appended claims.

What is claimed is:

1. A method of displaying webpage comments, comprising:
    sending a webpage browse request to a server, the webpage browse request comprising a webpage address;
    receiving webpage information corresponding to the webpage address returned by the server, the webpage information comprising source code and a comment object information list, each piece of comment object information in the comment object information list comprising position information of a webpage article element commented on by a user; and
    rendering and displaying a webpage article corresponding to the webpage address according to the source code comprised in the webpage information, and displaying webpage comments on a plurality of webpage article elements corresponding to the webpage address in an order according to the number of webpage comments on each of the plurality of webpage article elements, according to the comment object information list.

2. The method according to claim 1, wherein displaying the webpage comments comprises:
    acquiring, from each piece of comment object information in the comment object information list, the position information comprised in each piece of comment object information respectively;
    determining the number of webpage comments on said each of the plurality of webpage article elements according to the position information comprised in each piece of comment object information; and
    displaying, in a comment area of a webpage corresponding to the webpage address, the webpage comments on the plurality of webpage article elements in the order according to the determined number of webpage comments on said each of the plurality of webpage article elements.

3. The method according to claim 1, wherein:
    each piece of the comment object information in the comment object information list further comprises comment time; and
    displaying the webpage comments comprises:
    acquiring, from each piece of the comment object information in the comment object information list, the comment time comprised in each piece of comment object information respectively; and
    displaying, in a comment area of a webpage corresponding to the webpage address, a plurality of webpage comments on one of the plurality of webpage article elements in an order according to the acquired comment time.

4. The method according to claim 1, wherein the webpage information further comprises a comment number list that comprises position information of webpage article elements in the webpage article and the number of comments; and the method further comprising:
    generating, from a start position of the webpage article, a hotspot distribution bar corresponding to the webpage article on the basis of a preset coloring strategy and according to the position information of the webpage article elements and the number of comments comprised in the comment number list; and
    embedding the hotspot distribution bar into a scroll bar of the webpage article, to obtain a popularity scroll bar corresponding to the webpage article.

5. The method of claim 1, further comprising:
when a comment event triggered by a comment trigger element in a webpage corresponding to the webpage address is detected, acquiring another piece of position information of an article element to be commented on corresponding to the comment event, comment information input by another user, and a user ID of the another user;
generating another piece of comment object information according to the another piece of position information, the comment information, the user ID, and current time; and
updating the displayed webpage comments based on the generated another piece of comment object information.

6. The method according to claim 5, wherein: the comment trigger element comprises a comment tracking button; and before acquiring said another piece of the position information of the article element to be commented on, the method further comprising:
monitoring in real time the comment tracking button in the webpage, and determining, when a single click event of the comment tracking button is monitored, that the comment tracking button triggers a comment event.

7. The method according to claim 5, wherein the comment trigger element comprises all webpage article elements currently displayed in a screen display area, and the method further comprising:
monitoring in real time all the webpage article elements, and, when a long press event of a webpage article element in all the webpage article elements is detected, determining that the webpage article element corresponding to the long press event triggers a comment event.

8. The method according to claim 5, wherein acquiring the another piece of position information of the article element to be commented on corresponding to the comment event, the comment information input by the another user, and the user ID of the another user comprises:
querying whether the source code of the webpage comprises a Hyper Text Markup Language (HTML) object ID of the article element to be commented on;
in response to determining that the source code of the webpage comprises the HTML object ID of the article element to be commented on, acquiring, from the source code, the HTML object ID of the article element to be commented on as the position information of the article element to be commented on; and
in response to determining that the source code of the webpage does not comprise the HTML object ID of the article element to be commented on, assigning a unique ID to the article element to be commented on, and determining the assigned unique ID as the position information of the article element to be commented on.

9. A method of displaying webpage comments, comprising:
receiving a webpage browse request sent by an end-user browser, the webpage browse request comprising a webpage address;
acquiring webpage information corresponding to the webpage address according to the webpage address, the webpage information comprising source code and a comment object information list, each piece of comment object information in the comment object information list comprising position information of a webpage article element commented on by a user; and
sending the webpage information to the end-user browser, causing the end-user browser to display webpage comments on a plurality of webpage article elements corresponding to the webpage address in an order according to the number of webpage comments on each of the plurality of webpage article elements, according to the comment object information list.

10. The method of claim 9, further comprising:
receiving another webpage address and another piece of comment object information sent by the end-user browser, the another piece of comment object information comprising position information of an article element commented on;
generating update information corresponding to the another webpage address according to the another piece of comment object information;
determining, according to the another webpage address, an end-user browser that is accessing the another webpage address currently; and
sending the update information to the determined end-user browser, causing the determined end-user browser to update a comment area of a webpage corresponding to the another webpage address according to the update information.

11. A device of displaying webpage comments, comprising:
a processor; and
a non-transitory computer-readable memory storing instructions that, when executed by the processor, cause the processor to:
send a webpage browse request to a server, the webpage browse request comprising a webpage address;
receive webpage information corresponding to the webpage address returned by the server, the webpage information comprising source code and a comment object information list, each piece of comment object information in the comment object information list comprising position information of a webpage article element commented on by a user; and
render and display a webpage article corresponding to the webpage address according to the source code comprised in the webpage information, and display webpage comments on a plurality of webpage article elements corresponding to the webpage address in an order according to the number of webpage comments on each of the plurality of webpage article elements, according to the comment object information list.

12. The device according to claim 11, wherein, to display the webpage comments, the instructions, when executed by the processor, are configured to cause the processor to:
acquire, from each piece of comment object information in the comment object information list, the position information comprised in each piece of comment object information respectively;
determine the number of webpage comments on said each of the plurality of webpage article elements according to the position information comprised in each piece of comment object information; and
display, in a comment area of a webpage corresponding to the webpage address, the webpage comments on the plurality of webpage article elements in the order according to the determined number of webpage comments on said each of the plurality of webpage article elements.

13. The device according to claim 11, wherein each piece of the comment object information in the comment object information list further comprises comment time; and to display the webpage comments, the instructions, when executed by the processor, are configured to cause the processor to:
    acquire, from each piece of the comment object information in the comment object information list, the comment time comprised in each piece of comment object information respectively; and
    display, in a comment area of a webpage corresponding to the webpage address, a plurality of webpage comments on one of the plurality of webpage article elements in an order according to the acquired comment time.

14. The device according to claim 11, wherein the webpage information further comprises a comment number list that comprises position information of webpage article elements in the webpage article and the number of comments; and the instructions, when executed by the processor, are configured to further cause the processor to:
    generate, from a start position of the webpage article, a hotspot distribution bar corresponding to the webpage article on the basis of a preset coloring strategy and according to the position information of the webpage article elements and the number of comments comprised in the comment number list; and
    embed the hotspot distribution bar into a scroll bar of the webpage article, to obtain a popularity scroll bar corresponding to the webpage article.

15. The device according to claim 11, the instructions, when executed by the processor, are configured to further cause the processor to:
    acquire, when a comment event triggered by a comment trigger element in a webpage corresponding to the webpage address is determined, position information of an article element to be commented on corresponding to the comment event, another piece of comment information input by a user, and a user ID of the user;
    generate another piece of comment object information according to the position information, the another piece of comment information, the user ID, and current time; and
    update the displayed webpage comments based on the generated another piece of comment object information.

16. The device according to claim 15, wherein:
    the comment trigger element comprises a comment tracking button;
    the comment trigger element comprises all webpage article elements currently displayed in a screen display area; and
    the instructions, when executed by the processor, are configured to further cause the processor to monitor in real time the comment tracking button in the webpage, and determine, when a single click event of the comment tracking button is monitored, that the comment tracking button triggers a comment event.

17. The device according to claim 15, wherein:
    the comment trigger element comprises all webpage article elements currently displayed in a screen display area; and
    the instructions, when executed by the processor, are configured to further cause the processor to monitor in real time all the webpage article elements, and determine, when a long press event of a webpage article element in all the webpage article elements is monitored, that the webpage article element corresponding to the long press event triggers another comment event.

18. The device according to claim 15, wherein:
    to acquire the another piece of position information of the article element to be commented on corresponding to the comment event, the comment information input by the another user, and the user ID of the another user, the instructions, when executed by the processor, are configured to cause the processor to:
    query whether the source code of the webpage comprises a Hyper Text Markup Language (HTML) object ID of the article element to be commented on;
    in response to determining that the source code of the webpage comprises the HTML object ID of the article element to be commented on, acquire, from the source code, the HTML object ID of the article element to be commented on as the position information of the article element to be commented on; and
    in response to determining that the source code of the webpage does not comprise the HTML object ID of the article element to be commented on, assign a unique ID to the article element to be commented on, and determine the assigned unique ID as the position information of the article element to be commented on.

19. A device of displaying webpage comments, comprising:
    a processor; and
    a non-transitory computer-readable memory storing instructions that, when executed by the processor, cause the processor to:
    receive a webpage browse request sent by an end-user browser, the webpage browse request comprising a webpage address;
    acquire webpage information corresponding to the webpage address according to the webpage address, the webpage information comprising source code and a comment object information list, each piece of comment object information in the comment object information list comprising position information of a webpage article element commented on by a user; and
    send the webpage information to the end-user browser, causing the end-user browser to display webpage comments on a plurality of webpage article elements corresponding to the webpage address in an order according to the number of webpage comments on each of the plurality of webpage article elements, according to the comment object information list.

20. The device of claim 19, wherein the instructions, when executed by the processor, are configured to further cause the processor to:
    receive another webpage address and another piece of comment object information sent by the end-user browser, the another piece of comment object information comprising position information of an article element commented on;
    generate update information corresponding to the another webpage address according to the another piece of comment object information;
    determine, according to the another webpage address, an end-user browser that is accessing the another webpage address currently; and
    send the update information to the determined end-user browser, causing the determined end-user browser to update a comment area of a webpage corresponding to the another webpage address according to the update information.

* * * * *